US009464960B2

(12) United States Patent
Nishimura

(10) Patent No.: US 9,464,960 B2
(45) Date of Patent: Oct. 11, 2016

(54) LIQUID SUBMERGED PORTION FUEL LEAKAGE DIAGNOSTIC APPARATUS

(71) Applicant: Yuusaku Nishimura, Toyota (JP)

(72) Inventor: Yuusaku Nishimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 500 days.

(21) Appl. No.: 13/870,559

(22) Filed: Apr. 25, 2013

(65) Prior Publication Data

US 2013/0312494 A1    Nov. 28, 2013

(30) Foreign Application Priority Data

May 22, 2012 (JP) .................. 2012-116604

(51) Int. Cl.
G01M 3/02 (2006.01)
G01M 3/32 (2006.01)

(52) U.S. Cl.
CPC ........... G01M 3/025 (2013.01); G01M 3/3245 (2013.01)

(58) Field of Classification Search
CPC .......................... G01M 3/025; G01M 3/3245
USPC ............................. 73/45.5, 49.2, 49.3, 49.7
See application file for complete search history.

(56) References Cited

U.S. PATENT DOCUMENTS

| 6,148,803 | A | * | 11/2000 | Majima | .............. | F02M 25/0809 |
| | | | | | | 123/520 |
| 2004/0089064 | A1 | * | 5/2004 | Kidokoro | ........... | F02M 25/0809 |
| | | | | | | 73/114.41 |
| 2004/0154596 | A1 | * | 8/2004 | Mitani | ................... | F02M 25/08 |
| | | | | | | 123/509 |
| 2004/0200460 | A1 | * | 10/2004 | Mitani | ............... | F02M 25/0818 |
| | | | | | | 123/520 |
| 2006/0144370 | A1 | * | 7/2006 | Iihoshi | ............... | F02M 25/0809 |
| | | | | | | 123/491 |
| 2007/0220969 | A1 | * | 9/2007 | Nakano | ................... | G01M 3/24 |
| | | | | | | 73/314 |

FOREIGN PATENT DOCUMENTS

| JP | 11-037457 | A | | 2/1999 | | |
| JP | 2003254173 | A | * | 9/2003 | .......... | B60K 15/035 |
| JP | 2004-270573 | A | | 9/2004 | | |
| JP | 2006-170074 | A | | 6/2006 | | |
| JP | 2007-114082 | A | | 5/2007 | | |
| JP | 2010-270618 | A | | 12/2010 | | |

* cited by examiner

*Primary Examiner* — Laura Martin
*Assistant Examiner* — Suman K Nath
(74) *Attorney, Agent, or Firm* — Dinsmore & Shohl LLP

(57) ABSTRACT

A liquid submerged portion fuel leakage diagnostic apparatus includes a tank internal pressure detection portion; a liquid level detection portion; a reference-state liquid level extraction portion configured to extract, as a reference-state liquid level, a liquid level detected by the liquid level detection portion, when a tank internal pressure detected by the tank internal pressure detection portion becomes equal to a reference internal pressure; a fuel consumption detection portion configured to detect consumption of fuel in a fuel tank; and a fuel leakage diagnostic portion configured such that if the fuel consumption is not detected by the fuel consumption detection portion during a period between extraction timings at which the reference-state liquid levels are extracted by the reference-state liquid level extraction portion, the fuel leakage diagnostic portion diagnoses presence or absence of fuel leakage from a liquid submerged portion based on comparison of the reference-state liquid levels.

7 Claims, 15 Drawing Sheets

LIQUID SUBMERGED PORTION FUEL LEAKAGE DIAGNOSTIC APPARATUS

INCORPORATION BY REFERENCE

The disclosure of Japanese Patent Application No. 2012-116604 filed on May 22, 2012 including the specification, drawings and abstract is incorporated herein by reference in its entirety.

BACKGROUND OF THE INVENTION

1. Field of the Invention

The invention relates to a liquid submerged portion fuel leakage diagnostic apparatus that diagnoses the presence or absence of leakage of fuel from a liquid submerged portion of a fuel tank for an internal combustion engine, the liquid submerged portion being submerged in fuel in the fuel tank, and the fuel tank being connected to a canister via a vaporized fuel passage, and being configured such that an is internal space thereof is able to be hermetically closed by a block valve provided in the vaporized fuel passage.

2. Description of Related Art

There is known a technique in which, during a stop of an internal combustion engine, a vaporized fuel treating mechanism for an internal combustion engine which includes a fuel tank is depressurized by a pump, and the presence or absence of leak from the vaporized fuel treating mechanism is diagnosed on the basis of change in the internal pressure in a path during the pressure reduction (see, e.g., Japanese Patent Application Publication No. 2006-170074 (JP 2006-170074 A)).

There have been proposed a system that performs the aforementioned fuel vapor leak diagnosis on the basis of the presence or absence of change in the fuel liquid surface height in a fuel trapper (see, e.g., Japanese Patent Application Publication No. 2010-270618 (JP 2010-270618 A)) and a system that performs correction of data used for fuel vapor leak determination on the basis of the value indicated by a level gauge that detects the fuel liquid surface (see, e.g., Japanese Patent Application Publication No. 2004-270573 (JP 2004-270573 A)).

The leak diagnostic technologies described in the aforementioned publications JP 2006-170074 A, JP 2010-270618 A and JP 2004-270573 A are the same in that leakage of fuel vapor present in an upper space above the fuel liquid surface in the fuel tank is detected on the basis of change in pressure.

As for the fuel leakage, fuel can sometimes leak from a region below the fuel liquid surface in the fuel tank, that is, from a liquid submerged portion of the fuel tank. Such leakage from the liquid submerged portion is leakage of liquid. Unlike leakage of gas, leakage of liquid does not readily manifest itself as a change in the pressure in the upper space above the fuel liquid surface.

Therefore, the fuel leakage from the liquid submerged portion cannot be detected by the leak diagnostic systems as described in JP 2006-170074 A, JP 2010-270618 A and JP 2004-270573 A, so that a suitable diagnostic device has been required.

SUMMARY OF THE INVENTION

The invention provides a system that diagnoses presence or absence of fuel leakage from a liquid submerged portion of a fuel tank for an internal combustion engine.

A first aspect of the invention relates to a liquid submerged portion fuel leakage diagnostic apparatus that diagnoses presence or absence of fuel leakage from a liquid submerged portion of a fuel tank for an internal combustion engine, the liquid submerged portion being submerged in fuel in the fuel tank, and the fuel tank being connected to a canister via a vaporized fuel passage and being configured such that an internal space of the fuel tank is able to be hermetically closed by a block valve that is provided in the vaporized fuel passage. The liquid submerged portion fuel leakage diagnostic apparatus includes a tank internal pressure detection portion configured to detect a tank internal pressure of the fuel tank; a liquid level detection portion configured to detect a liquid level of the fuel in the fuel tank; a reference-state liquid level extraction portion configured to extract, as a reference-state liquid level, the liquid level detected by the liquid level detection portion, when the tank internal pressure detected by the tank internal pressure detection portion becomes equal to a reference internal pressure; a fuel consumption detection portion configured to detect fuel consumption that is consumption of the fuel in the fuel tank; and a fuel leakage diagnostic portion configured such that if the fuel consumption is not detected by the fuel consumption detection portion during a period between extraction timings at which a plurality of the reference-state liquid levels are extracted by the reference-state liquid level extraction portion, the fuel leakage diagnostic portion diagnoses the presence or absence of the fuel leakage from the liquid submerged portion based on comparison of the plurality of the reference-state liquid levels.

When the tank internal pressure is equal to the reference internal pressure, the amount of strain (deformation) of the fuel tank due to the tank internal pressure is a constant amount, and the internal volume of the fuel tank is kept constant. Therefore, if fuel in the fuel tank is not consumed by, for example, operation of the internal combustion engine, or if an extremely small amount of fuel is consumed and therefore substantially no fuel consumption is detected, the value of the liquid level detected by the liquid level detection portion remains constant.

However, there is a case where the liquid level of fuel changes, more specifically, the liquid level decreases, in a situation in which the tank internal pressure is equal to the reference internal pressure and no fuel consumption is occurring or an extremely small amount of fuel is consumed and therefore substantially no fuel consumption is detected. In this case, it can be determined that the liquid level has decreased due to occurrence of fuel leakage from the liquid submerged portion the fuel tank.

Therefore, when the tank internal pressure detected by the tank internal pressure detection portion becomes equal to the reference internal pressure, the reference-state liquid level extraction portion extracts the liquid level detected by the liquid level detection portion as the reference-state liquid level. Then, if the fuel consumption is not detected by the fuel consumption detection portion during a period between the extraction timings at which a plurality of the reference-state liquid levels are extracted by the reference-state liquid level extraction portion, the fuel leakage diagnostic portion can diagnose the presence or absence of fuel leakage from the liquid submerged portion on the basis of comparison of the plurality of reference-state levels.

That is, if the reference-state liquid level has not changed, it can be determined that there is no fuel leakage from the liquid submerged portion, and if the reference-state liquid level has decreased, it can be determined that there is fuel leakage from the liquid submerged portion. Thus, it is possible to diagnose the presence or absence of the fuel leakage from the liquid submerged portion, which cannot be diagnosed in related-art leak diagnostic systems that detect leakage of fuel vapor from the upper space about the fuel liquid surface in a fuel tank.

In the liquid submerged portion fuel leakage diagnostic apparatus according to the above-described aspect, the fuel consumption detected by the fuel consumption detection portion may include the fuel consumption due to operation of the internal combustion engine and the fuel consumption resulting from outflow of fuel vapor into the vaporized fuel passage when the block valve is open, and an amount of the fuel consumption detected by the fuel consumption detection portion is an amount that influences a value detected by the liquid level detection portion.

Examples of the fuel consumption detected by the fuel consumption detection portion include the fuel consumption due to operation of the internal combustion engine and the fuel consumption resulting from outflow of fuel vapor into the vaporized fuel passage when the block valve is open. Particularly, the amount of the above-described fuel consumption is an amount that influences the value detected by the liquid level detection portion. Therefore, in the case where the internal combustion engine is operated or the block valve is open during an extremely short period and therefore an amount of fuel consumption is an extremely small amount, the extremely small amount of fuel consumption is not regarded as the amount of fuel consumption that influences the value detected by the liquid level detection portion.

When the fuel consumption detection portion detects the fuel consumption, the reference-state liquid level decreases even if the fuel is not leaking from the liquid submerged portion of the fuel tank. However, if the reference-state liquid level decreases while the fuel consumption is not detected, it is clear that there is fuel leakage from the liquid submerged portion.

Therefore, by comparing the plurality of the reference-state liquid levels when the fuel consumption is not detected by the fuel consumption detection portion, it is possible to accurately diagnose the presence or absence of the fuel leakage from the liquid submerged portion.

The liquid submerged portion fuel leakage diagnostic apparatus according to the above-described aspect may further include a fuel vapor leak diagnostic portion configured to diagnose presence or absence of fuel vapor leak from the fuel tank, wherein the fuel consumption detected by the fuel consumption detection portion may include the fuel consumption due to the fuel vapor leak, presence of which is diagnosed by the fuel vapor leak diagnostic portion, the fuel consumption due to operation of the internal combustion engine, and the fuel consumption resulting from outflow of fuel vapor into the vaporized fuel passage when the block valve is open and an amount of the fuel consumption detected by the fuel consumption detection portion is an amount that influences a value detected by the liquid level detection portion.

Examples of the fuel consumption detected by the fuel consumption detection portion include fuel vapor leak from the upper space above the fuel liquid surface in the fuel tank as well as the fuel consumption due to operation of the internal combustion engine and the fuel consumption resulting from outflow of fuel vapor into the vaporized fuel passage when the block valve is open. Particularly, the amount of the above-described fuel consumption is an amount that influences the value detected by the liquid level detection portion.

The fuel leakage diagnostic portion diagnoses the presence or absence of the fuel leakage from the liquid submerged portion on the basis of comparison of the plurality of the reference-state liquid levels when the aforementioned fuel consumption is not detected by the fuel consumption detection portion. Thus, it is possible to accurately diagnose the presence or absence of the fuel leakage from the liquid submerged portion.

The liquid submerged portion fuel leakage diagnostic apparatus according to the above-described aspect may further include a fuel vapor leak diagnostic portion configured to diagnose presence or absence of fuel vapor leak from the fuel tank, and the liquid submerged portion fuel leakage diagnostic apparatus may be configured such that the fuel leakage diagnostic portion does not make a determination that there is a fuel leakage abnormality in the liquid submerged portion, if the fuel vapor leak diagnostic portion determines that there is a fuel vapor leak abnormality.

In the case where it is determined that there is an abnormality, that is, there is leak of fuel vapor from the upper space above the fuel liquid surface in the fuel tank, even if a decrease in the liquid level is detected, it cannot be determined whether the decrease in the liquid level has resulted from outflow of fuel vapor from the fuel tank due to continuing leak of fuel vapor or has resulted from fuel leakage from the liquid submerged portion.

However, in the case where a decrease in the liquid level is not detected, neither the fuel leakage from the liquid submerged portion nor the leak of fuel vapor from the upper space is present. Alternatively, if fuel leakage from the liquid submerged portion is not present and leak of fuel vapor from the upper space is present, it is clear that the amount of fuel vapor leak is a small amount that does not influence the liquid level.

Therefore, in the case where the fuel vapor leak diagnostic portion determines that there is a fuel vapor leak abnormality, the fuel leakage diagnostic portion does not make a determination that there is a fuel leakage abnormality in the liquid submerged portion. However, the fuel leakage diagnostic portion is allowed to make a normality determination that there is no fuel leakage from the liquid submerged portion. Therefore, the frequency of the accurate diagnosis regarding fuel leakage from the liquid submerged portion can be increased.

In the liquid submerged portion fuel leakage diagnostic apparatus according to the above-described aspect, the reference internal pressure may be an atmospheric pressure.

In particular, when the reference internal pressure is set at the atmospheric pressure, there is no pressure difference between the outside and the inside of the fuel tank. Hence, the reference-state liquid level extraction portion extracts the reference-state liquid level when the tank outer shell does not have strain (deformation) based on the pressure difference between the outside and the inside of the fuel tank. Therefore, it is possible to more accurately diagnose the presence or absence of the fuel leakage from the liquid submerged portion.

In the liquid submerged portion fuel leakage diagnostic apparatus according to the above-described aspect, the reference internal pressure may be a pressure other than an atmospheric pressure.

Furthermore, a pressure other than the atmospheric pressure may be set as the reference internal pressure, and the reference-state liquid level extraction portion may extract the reference-state liquid level when the tank outer shell always has a constant strain (deformation) due to the pressure difference between the outside and the inside of the fuel tank. Since the strain is constant, it is possible to accurately diagnose the presence or absence of the fuel leakage from the liquid submerged portion.

The liquid submerged portion fuel leakage diagnostic apparatus according to the above-described aspect may further include a temperature detection portion configured to detect a temperature in the fuel tank, wherein the reference-state liquid level extraction portion may correct the liquid level detected by the liquid level detection portion by using the temperature detected by the temperature detection portion, and extracts the corrected liquid level as the reference-state liquid level.

In the case where a pressure other than the atmospheric pressure is set as the reference internal pressure and therefore the tank outer shell has a constant strain, the amount of strain of the fuel tank may change according to temperature, depending on the material or shape of the fuel tank outer shell.

Therefore, the reference-state liquid level extraction portion corrects the liquid level detected by the liquid level detection portion by using the temperature detected by the temperature detection portion, and extracts the corrected liquid level as the reference-state liquid level. Therefore, appropriate reference-state liquid levels to be compared can be obtained. Accordingly, it is possible to accurately diagnose the presence or absence of the fuel leakage from the liquid submerged portion.

A second aspect of the invention relates to a liquid submerged portion fuel leakage diagnostic apparatus that diagnoses presence or absence of fuel leakage from a liquid submerged portion of a fuel tank for an internal combustion engine, the liquid submerged portion being submerged in fuel in the fuel tank, and the fuel tank being connected to a canister via a vaporized fuel passage and being configured such that an internal space of the fuel tank is able to be hermetically closed by a block valve that is provided in the vaporized fuel passage. The liquid submerged portion fuel leakage diagnostic apparatus includes a tank internal pressure detection portion configured to detect a tank internal pressure of the fuel tank; a liquid level detection portion configured to detect a liquid level of the fuel in the fuel tank; a normality time relation storage portion configured to store a normality-time correspondence relation between the liquid level of the fuel in the fuel tank and the tank internal pressure when there is no fuel leakage from the liquid submerged portion; a fuel consumption detection portion configured to detect fuel consumption that is consumption of the fuel in the fuel tank; and a fuel leakage diagnostic portion configured to diagnose the presence or absence of the fuel leakage from the liquid submerged portion of the fuel tank by using the normality-time correspondence relation that is stored in the normality-time relation storage portion, based on a plurality of combination pairs of the liquid level detected by the liquid level detection portion and the tank internal pressure detected by the tank internal pressure detection portion during a period during which the fuel consumption is not detected by the fuel consumption detection portion.

When there is no fuel leakage from the liquid submerged portion, the fuel liquid level in the fuel tank changes in constant relation with the tank internal pressure on the basis of the amount of strain caused by the pressure difference between the outside and the inside of the fuel tank as mentioned above. Therefore, since the normality-time relation storage portion stores the normality-time correspondence relation, the fuel leakage diagnostic portion can diagnose the presence or absence of the fuel leakage from the liquid submerged portion of the fuel tank by using the normality-time correspondence relation.

That is, the fuel leakage diagnostic portion can diagnose the presence or absence of the fuel leakage from the liquid submerged portion of the fuel tank, by using the normality-time correspondence relation that is stored in the normality-time relation storage portion, on the basis of the plurality of combination pairs of the liquid level detected by the liquid level detection portion and the tank internal pressure detected by the tank internal pressure detection portion during the period during which the fuel consumption is not detected by the fuel consumption detection portion.

Specifically, when the plurality of pairs of the actual liquid level and the actual tank internal pressure exhibit a relation that corresponds to the normality-time correspondence relation, it can be determined that there is no fuel leakage from the liquid submerged portion of the fuel tank, and when the plurality of pairs of the actual liquid level and the actual tank internal pressure do not exhibit a relation that corresponds to the normality-time correspondence relation, it can be determined that there is fuel leakage from the liquid submerged portion of the fuel tank.

Therefore, it is possible to diagnose the presence or absence of the fuel leakage from the liquid submerged portion of the fuel tank more highly frequently by detecting the liquid level and the tank internal pressure without waiting for the tank internal pressure to reach a specific reference internal pressure.

In the liquid submerged portion fuel leakage diagnostic apparatus according to the second aspect, the normality-time relation storage portion may store the normality-time correspondence relation set using a relation between the tank internal pressure detected by the tank internal pressure detection portion and the liquid level detected by the liquid level detection portion during an initial period of use of the fuel tank.

During an initial period of use of the fuel tank, fuel leakage from the liquid submerged portion of the fuel tank does not exist due to the inspection performed when the fuel tank was produced or the fuel tank was installed for the internal combustion engine. Therefore, during an initial period of use of the fuel tank, the normality-time relation storage portion can obtain the normality-time correspondence relation by using a relation between the tank internal pressure detected by the tank internal pressure detection portion and the liquid level detected by the liquid level detection portion. Then, the normality-time relation storage portion stores the obtained normality-time correspondence relation so that the normality-time correspondence relation can be used later in the diagnostic process performed by the fuel leakage diagnostic portion. Thus, it is possible to diagnose the presence or absence of the fuel leakage from the liquid submerged portion of the fuel tank more highly frequently.

In the liquid submerged portion fuel leakage diagnostic apparatus according to the above-described second aspect, a diagnostic process may be performed by the liquid submerged portion fuel leakage diagnostic apparatus according to the above-described first aspect, and the normality-time relation storage portion may set the normality-time correspondence relation by using a relation between the tank internal pressure detected by the tank internal pressure detection portion and the liquid level detected by the liquid level detection portion, during a period during which the fuel consumption is not detected by the fuel consumption detection portion and during which the liquid submerged portion fuel leakage diagnostic apparatus according to the above-described first aspect determines that there is no fuel leakage from the liquid submerged portion.

The tank internal pressure and the liquid level in the fuel tank exhibit the normality-time correspondence relation during a period during which the fuel consumption is not detected by the fuel consumption detection portion and during which the liquid submerged portion fuel leakage diagnostic apparatus according to the second aspect determines that there is no fuel leakage from the liquid submerged portion.

Therefore, in such a case, the normality-time relation storage portion can set the normality-time correspondence relation by using the relation between the tank internal pressure detected by the tank internal pressure detection portion and the liquid level detected by the liquid level detection portion. Then, the normality-time relation storage portion stores the normality-time correspondence relation so that the stored normality-time correspondence relation can be used later in the diagnostic process performed by the fuel leakage diagnostic portion.

Once the normality-time correspondence relation is set as described above, the presence or absence of the fuel leakage from the liquid submerged portion of the fuel tank can be highly frequently diagnosed by detecting the liquid level and the tank internal pressure without waiting for the tank internal pressure to reach a specific reference internal pressure. Moreover, since the normality-time correspondence relation can be repeatedly measured in a state in which the fuel tank is actually mounted in a vehicle, the presence or absence of fuel leakage from the liquid submerged portion can be more accurately diagnosed.

In the liquid submerged portion fuel leakage diagnostic apparatus according to the above-described second aspect, the fuel consumption detected by the fuel consumption detection portion may include the fuel consumption due to operation of the internal combustion engine and the fuel consumption resulting from outflow of fuel vapor into the vaporized fuel passage when the block valve is open, and an amount of the fuel consumption detected by the fuel consumption detection portion is an amount that influences a value detected by the liquid level detection portion.

Examples of the fuel consumption detected by the fuel consumption detection portion include the fuel consumption due to operation of the internal combustion engine and the fuel consumption resulting from outflow of fuel vapor into the vaporized fuel passage when the block valve is open, as stated above. The operation and effects of the above-described diagnostic apparatus are also as stated above.

The liquid submerged portion fuel leakage diagnostic apparatus according to the above-described second aspect may further include a fuel vapor leak diagnostic portion configured to diagnose presence or absence of fuel vapor leak from the fuel tank, wherein the fuel consumption detected by the fuel consumption detection portion may include the fuel consumption due to the fuel vapor leak, presence of which is diagnosed by the fuel vapor leak diagnostic portion, the fuel consumption due to operation of the internal combustion engine, and the fuel consumption resulting from outflow of fuel vapor into the vaporized fuel passage when the block valve is open, and an amount of the fuel consumption detected by the fuel consumption detection portion may be an amount that influences a value detected by the liquid level detection portion.

Examples of the fuel consumption detected by the fuel consumption detection portion include fuel vapor leak from the upper space above the fuel liquid surface in the fuel tank as well as the fuel consumption due to operation of the internal combustion engine and the fuel consumption resulting from outflow of fuel vapor into the vaporized fuel passage when the block valve is open, as stated above. The operation and effects of the above-described diagnostic apparatus are also as stated above.

The liquid submerged portion fuel leakage diagnostic apparatus according to the second aspect may further include a temperature detection portion configured to detect a temperature in the fuel tank, wherein the fuel leakage diagnostic portion may correct the normality-time correspondence relation by using the temperature detected by the temperature detection portion, and may use the corrected normality-time correspondence relation.

The rigidity of the outer shell of the fuel tank may change according to change in temperature, depending on the material and shape of the outer shell. Therefore, the amount of strain of the tank outer shell, which is caused due to the pressure difference between the inside and the outside of the fuel tank, changes according to temperature.

In such cases, the fuel leakage diagnostic portion corrects the normality-time correspondence relation on the basis of the temperature detected by the temperature detection portion, and uses the corrected correspondence. Therefore, an appropriate normality-time correspondence relation can be obtained in accordance with change in temperature. Thus, it is possible to accurately diagnose the presence or absence of the fuel leakage from the liquid submerged portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Configuration of First Embodiment

Figure 1:
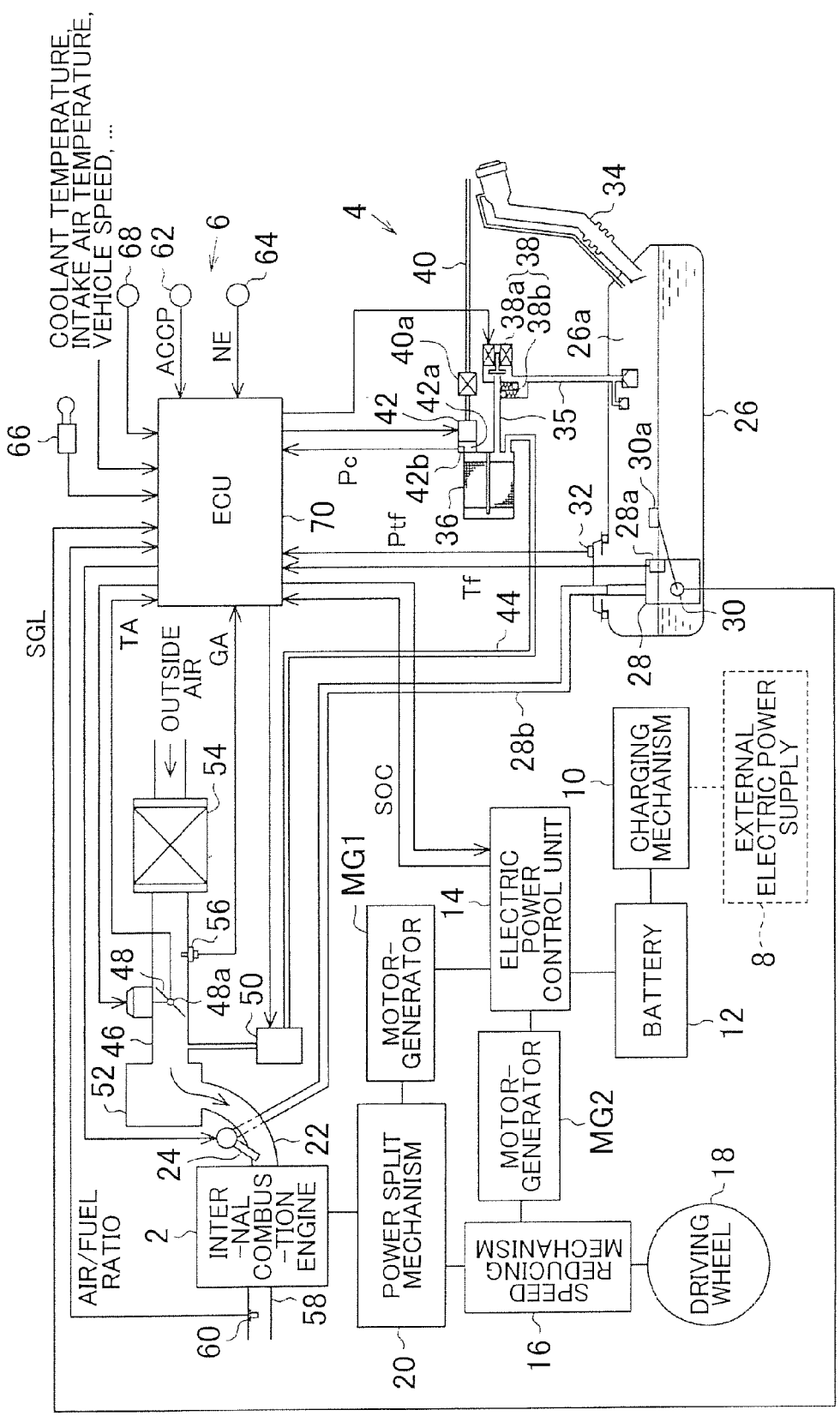
FIG. 1 is a configuration diagram of a drive system of a hybrid vehicle in accordance first embodiment of the invention.

A Drive system of a hybrid vehicle shown in FIG. 1 includes an internal combustion engine 2 and electric motors (motor-generators MG1 and MG2 described later). The internal combustion engine 2 is a gasoline engine. The internal combustion engine 2 includes a fuel supply system 4 and a control system 6.

This hybrid vehicle is a plug-in hybrid vehicle. Therefore, a battery 12 is charged with electric power supplied from an external electric power supply 8 via a charging mechanism 10. Electric power from the battery 12 is supplied to the motor-generator MG2 by an electric power control unit 14, so that the motor-generator MG2 outputs rotational drive force.

The rotational drive force from the internal combustion engine 2 and the motor-generator MG2 is reduced in speed by a speed reducing mechanism 16, and is then transferred to a driving wheel 18. A power split mechanism 20 is disposed between the internal combustion engine 2 and the speed reducing mechanism 16, whereby the rotational drive force from the internal combustion engine 2 can be split and accordingly supplied to the speed reducing mechanism 16 and another motor generator, that is, the motor-generator MG1 as an electric generator.

The two motor-generators MG1 and MG2 each function as both an electric generator and an electric motor. The function of each of the motor-generators MG1 and MG2 is switched between the two functions according to need. Each of intake ports 22 that correspond to the cylinders of the internal combustion engine 2 is provided with a fuel injection valve 24. These fuel injection valves 24 are supplied with fuel that is pumped from a fuel tank 26, in which fuel is reserved, through a fuel path 28b by a fuel pump module 28. Then, by the fuel injection control, fuel is injected into intake air from each fuel injection valve 24 at predetermined timing, and is therefore taken into the cylinder, and is burned therein. Thus, the internal combustion engine 2 is operated.

Furthermore, a fuel temperature sensor 28a (that may be regarded as a temperature detection portion) is disposed in a manner such that the fuel temperature sensor 28a is included in the fuel pump module 28. The fuel temperature sensor 28a detects the fuel temperature in the fuel supply system 4, particularly, the fuel temperature Tf in the fuel tank 26 in this embodiment.

The fuel supply system 4 has a function of supplying fuel to the internal combustion engine 2 and a function of treating vaporized fuel, and includes the fuel tank 26 and a canister 36 as well as various passages, various valves, various pumps, etc., which are attached to the tank 26 or the canister 36.

In the fuel tank 26, there is provided a fuel sender gauge 30 (that may be regarded as a liquid level detection portion, and) that detects the fuel liquid surface level SGL that is the liquid level of the fuel in the fuel tank 26, by using a float 30a. In an upper portion of the fuel tank 26, there is provided at tank internal pressure sensor 32 (that may be regarded as a tank internal pressure detection portion, and) that detects the pressure in an upper space 26a of the fuel tank 26 (tank internal pressure Ptf). The tank internal pressure Ptf (kPa) is actually a differential pressure between the atmospheric pressure and the pressure in the upper space 26a. Therefore, the tank internal pressure Ptf=0 kPa means that the pressure in the fuel tank 26 is equal to the atmospheric pressure outside the tank 26.

At the time of refueling, fuel is introduced into the fuel tank 26 via a fuel inlet pipe 34. The upper space of the fuel tank 26 is connected to the canister 36 by a vaporized fuel passage 35. In the vaporized fuel passage 35, there is provided a block valve 38 that includes an electromagnetic valve 38a for blocking the fuel tank 26, and a relief valve 38b.

The electromagnetic valve 38a a valve whose opening is electromagnetically controlled by energization. More specifically, the electromagnetic valve 38a is controlled to an open state at the time of refueling. As a result of opening the valve 38a, the upper space 26a of the fuel tank 26 and the interior of the canister 36 communicate with each other via the vaporized fuel passage 35. Therefore, during refueling, the fuel vapor occurring in the upper space 26a of the fuel tank 26 is discharged toward the canister 36. In the canister 36, fuel vapor from the fuel tank 26 adsorbs to an adsorbent housed therein, such as activated carbon or the like. This prevents fuel vapor from leaking to the outside.

When the electromagnetic valve 38a is in a closed state, that is, when the vaporized fuel passage 35 has been blocked so that the internal space of the fuel tank 26 is tightly closed, the fuel vapor occurring in the upper space 26a of the fuel tank 26 is not discharged toward the canister 36 unless the relief valve 38b is opened.

An atmosphere passage 40 that is open to the atmosphere is connected to the canister 36. In the atmosphere passage 40, there is provided an air filter 40a. Furthermore, in the atmosphere passage 40, there is provided a pump module 42 for leak diagnosis, at a position closer to the canister 36 than the air filter 40a is (i.e., the pump module 42 is provided between the canister 36 and the air filter 40a). The pump module 42 for leak diagnosis is provided with an atmosphere open-close valve 42a and a pressure sensor 42b. The atmosphere open-close valve 42a is configured as a normally-open electromagnetic valve. That is, during an ordinary time, including the time of refueling, the interior of the canister 36 is opened to the atmosphere via the atmosphere passage 40, and is closed when necessary, for example, at the time of leak diagnosis for a purge system or the like. The pressure sensor 42b detects the internal pressure Pc at the canister 36-side.

The canister 36 is connected to an intake passage 46 of the internal combustion engine 2 by a purge passage 44. In particular, the canister 36 is connected to the intake passage 46, at a position downstream of a throttle valve 48 that adjusts the flow rate of intake air. In the purge passage 44, there is provided a purge control valve 50 as a normally-closed type electromagnetic valve.

Purge is executed by opening the purge control valve 50 and the atmosphere open-close valve 42a during operation of the internal combustion engine 2. That is, as intake negative pressure in the intake passage 46 is introduced into the canister 36 from the purge passage 44, fuel vapor leaves the adsorbent in the canister 36, and is released into the stream of air introduced from the atmosphere passage 40. Then, the fuel vapor, carried by the air stream, passes through the purge passage 44 and the purge control valve 50, and is released into the intake air flowing in the intake passage 46. Then, the intake air containing the purged fuel vapor flows into the surge tank 52, and then is distributed to the intake ports 22 of the cylinders, and flows into the combustion chambers of the cylinders together with the fuel injected from the fuel injection valves 24, and is burned therein.

In the intake passage 46, an air flow meter 56 is provided between an air filter 54 and the throttle valve 48. The air flow meter 56 detects the flow rate GA (g/sec) of intake air supplied into the internal combustion engine 2.

An exhaust passage 58 for discharging exhaust gas from the internal combustion engine 2 subsequently to combustion is provided with an air/fuel ratio sensor (or an oxygen sensor) 60 that detects the air/fuel ratio or the oxygen concentration on the basis of exhaust gas components, for the purpose of air/fuel ratio feedback control.

In addition to the aforementioned devices and the like, there are provided an accelerator operation amount sensor 62 that is provided at an accelerator pedal operated by a vehicle driver so as to detect the accelerator operation amount ACCP, an engine rotation speed sensor 64 that detects the rotation speed NE of the crankshaft of the internal combustion engine 2, an IGSW (ignition switch) 66, a lid switch 68, and other sensors, switches, and the like. These sensors, switches, and the like individually output signals. Examples of other signals include signals that represent the coolant temperature, the intake air temperature, the vehicle speed, etc.

The signals from the fuel temperature sensor 28a, the fuel sender gauge 30, the tank internal pressure sensor 32, the throttle opening degree sensor 48a, the air flow meter 56, the air/fuel ratio sensor 60, the accelerator operation amount sensor 62, the engine rotation speed sensor 64, the IGSW 66, the lid switch 68, etc. are input to an ECU (electronic control circuit) 70 that is constituted mainly by a microcomputer.

Then, on the basis of the signal data as mentioned above and data stored beforehand or calculated, the ECU 70 executes computation processes to control the amount of fuel injection from the fuel injection valves 24, the degree of opening TA of the throttle valve 48, etc.

Furthermore, the ECU 70 executes a purge control during operation of the internal combustion engine 2. This purge control process is a process in which the fuel vapor adsorbed in the canister 36 when the block valve 38 is opened during refueling released into the intake passage 46 during operation of the internal combustion engine.

In this purge control process, the purge rate is adjusted through the duty control of the opening degree of the purge control valve 50 so that the fuel vapor adsorbed in the canister 36 is appropriately released into the intake passage 46 via the purge passage 44 as described above.

Operation of First Embodiment

Figure 2:
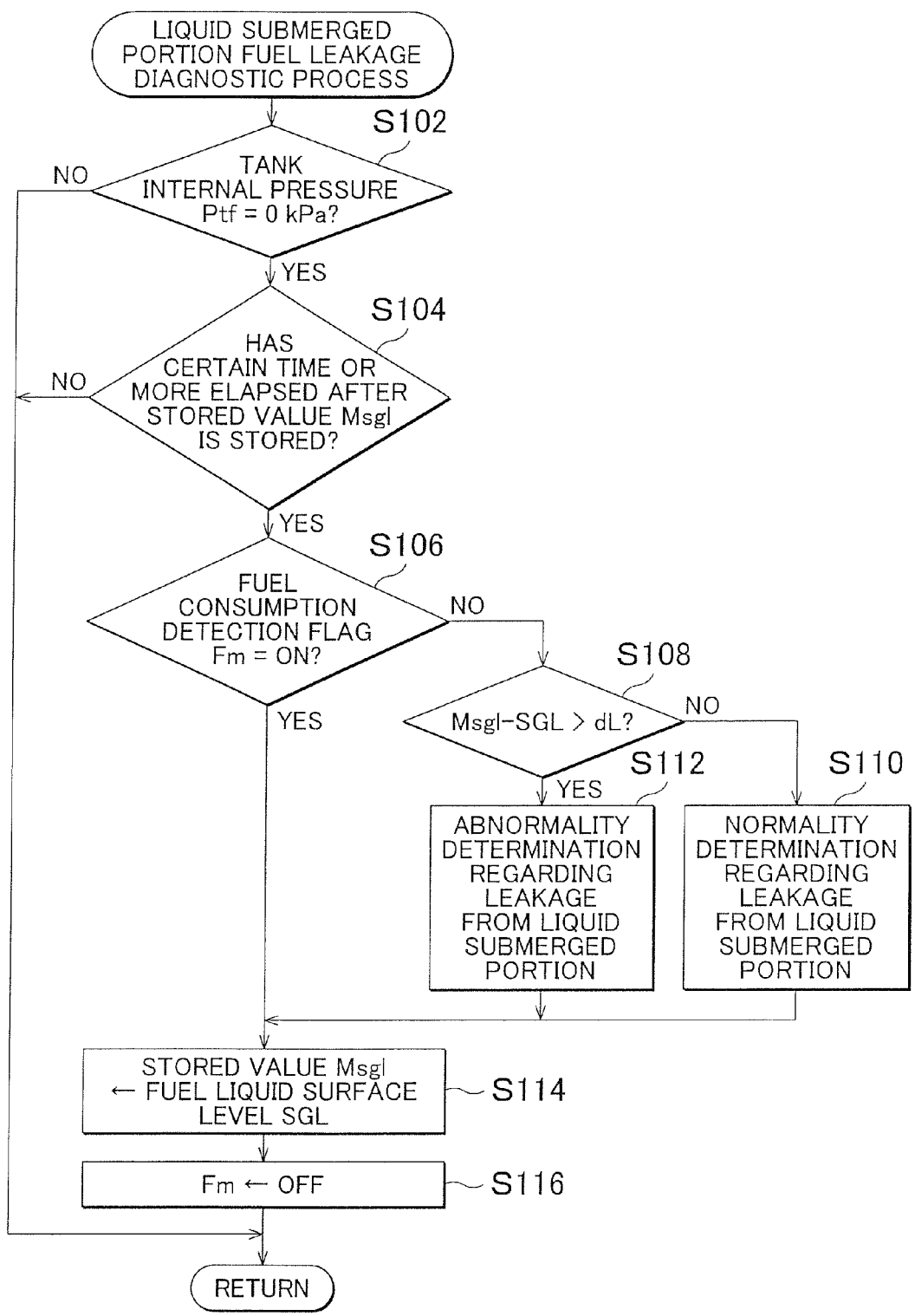
FIG. 2 is a flowchart of a liquid submerged portion fuel leakage diagnostic process executed by an ECU in the first embodiment.
Figure 3:
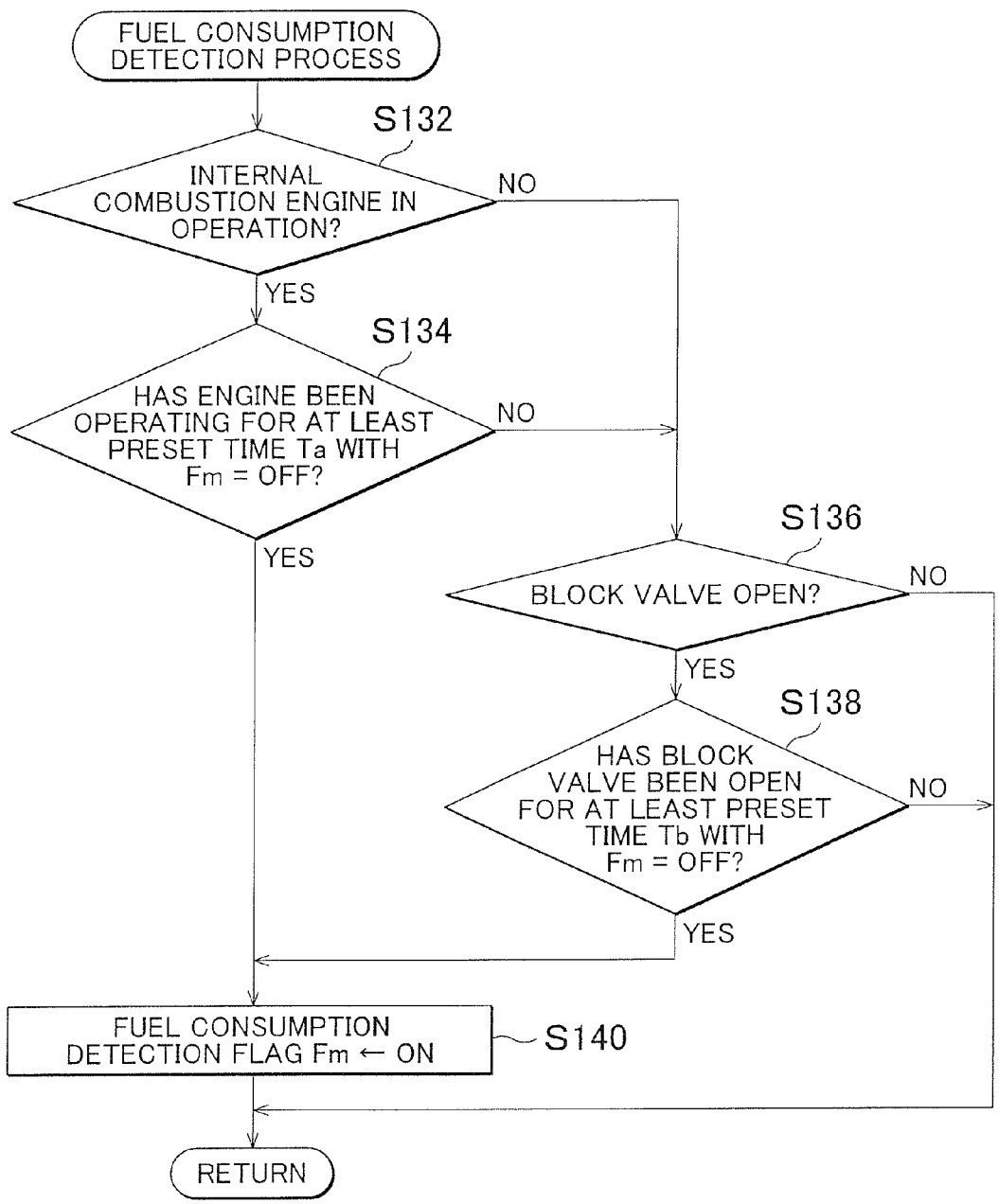
FIG. 3 is a flowchart of a fuel consumption detection process executed by the ECU in the first embodiment.

With reference to FIGS. 2 and 3, which show processes executed by the ECU 70, operation of the first embodiment will be described. The processes shown in the flowcharts of FIGS. 2 and 3 are repeatedly executed at every short time period (e.g., of 50 ms). The steps in the flowcharts which correspond to individual processing contents are indicated by "S".

A liquid submerged portion fuel leakage diagnostic process shown in FIG. 2 will be described. After the process starts, the ECU 70 determines whether the tank internal pressure Ptf is 0 kPa (S102). When the block valve 38 is in the closed state, the state of the tank internal pressure Ptf=0 kPa occurs in the course of events depending on change in the fuel temperature. Besides, when the block valve 38 is opened by the electromagnetic valve 38a during the purge control or refueling, the state of the tank internal pressure Ptf=0 kPa also occurs.

If the tank internal pressure Ptf≠0 kPa, that is, if the upper space 26a of the fuel tank 26 is not in an atmospheric pressure state (NO in S102), the process is ended. If the tank internal pressure Ptf=0 kPa, that is, if the upper space 26a of the fuel tank 26 is in the atmospheric pressure state (YES in S102), the ECU 70 determines whether a certain time or more has elapsed after a stored value Msg1 described below is set (S104). The certain time is set at a length of time that is required for fuel leakage from a liquid submerged portion of the fuel tank 26 to manifest itself clearly as a change in the fuel liquid surface level SGL, if the fuel leakage from the liquid submerged portion of the fuel tank 26 occurs (i.e., the certain time is set at a length of time that is required for the fuel liquid surface level SGL to clearly change if the fuel leakage from the liquid submerged portion of the fuel tank 26 occurs). For example, the certain time is set at a length of time of several ten minutes or more.

If the certain time or more has not elapsed after the stored value Msg1 is set (NO in S104), the process is ended. If the certain time or more has elapsed after the stored value Msg1 is set (YES in S104), it is then determined whether a fuel consumption flag Fm is in the ON state (S106). The fuel consumption flag Fm is set to the ON state in the below-described fuel consumption detection process (FIG. 3) when fuel in the fuel tank 26 is consumed and the consumption of fuel is so large as to manifest itself as a change in the fuel liquid surface level SGL (i.e., when consumption of fuel in the fuel tank 26 changes the fuel liquid surface level SGL). In this process, the fuel consumption flag Fm is set to the OFF state after the stored value Msg1 is stored.

If the fuel consumption flag Fm is in the OFF state (NO in S106), evaluation is performed using Expression 1 (S104).

$$Msg1-SGL>dL \quad \text{(Expression 1)}$$

Each of the stored value Msg1 and the fuel liquid surface level SGL in Expression 1 may be regarded as a reference-state liquid level.

The decrease evaluation value dL is a value for showing that in comparison with the stored value Msg1, the present fuel liquid surface level SGL has become sufficiently low beyond error. Note that the evaluation value dL may be 0, and the decrease evaluation value dL may also be set according to the time difference between the timing of setting the stored value Msg1 in step S114 and the timing of detecting the fuel liquid surface level SGL in the present cycle.

If Expression 1 is not satisfied (NO in S108), there is no consumption of fuel in the fuel tank 26 (Fm=OFF) and the amount of fuel has actually not decreased. Therefore, a normality determination is made regarding leakage from the liquid submerged portion, that is, it is determined that there is no fuel leakage from the liquid submerged portion of the fuel tank 26 (S110).

If Expression 1 is satisfied (YES in S108), the amount of fuel has actually decreased although there is no consumption of fuel in the fuel tank 26 (Fm=OFF). Therefore, an abnormality determination regarding leakage from the liquid submerged portion is made, that is, it is determined that there is fuel leakage from the liquid submerged portion of the fuel tank 26 (S112).

Then, the value of the fuel liquid surface level SGL detected in the present cycle is set as the stored value Msg1 provided in a memory (S114), and the fuel consumption flag Fm provided in the non-volatile memory is set to the OFF state (S116). After that, the process is ended.

If the fuel consumption flag Fm is in the ON state (YES in S106), the above-described diagnostic process (S108 to S112) is not executed, and the fuel liquid surface level SGL detected in the present cycle is set as the stored value Msg1 (S114), and the fuel consumption flag Fm is set to the OFF state. After that, the process is ended.

A fuel consumption detection process shown in FIG. 3 will be described. After the process starts, firstly the ECU 70 determines whether the internal combustion engine 2 is in operation (S132). If the internal combustion engine 2 is in operation as the vehicle is traveling using the output of the internal combustion engine 2 and the motor-generator MG2 in the HV travel state (YES in S132), it is then determined whether the operation of the internal combustion engine 2 with the fuel consumption flag Fm=OFF has continued for a predetermined time Ta or more (S134).

It is to be noted herein that when the internal combustion engine starts operating, the consumption of fuel in the fuel tank 26 starts, and there is to time lag until the value of the fuel liquid surface level SGL detected by the fuel sender gauge 30 decreases. Hence, such a time lag is set as the predetermined time Ta.

Thus, if the operation of the internal combustion engine 2 with the fuel consumption flag Fm=OFF has continued for the predetermined time Ta or more (YES in S134), the fuel consumption flag Fm is set to the ON state (S140). If the internal combustion engine 2 is not in operation as the vehicle travels using only the output of the motor-generator MG2 in the EV travel state or the vehicle is being refueled (NO in S132), or if the operation of the internal combustion engine 2 with the fuel consumption flag Fm=OFF has not continued for the predetermined time Ta (NO in S134), it is then determined whether the block valve 38 is in the open state (S136). If the block valve 38 is in the open state as the purge control is being executed or as the vehicle is being refueled (YES in S136), it is then determined whether the open state of the block valve 38 with the fuel consumption flag Fm=OFF has continued for a predetermined time Tb or more (S138).

If the pressure in the upper space 26a of the fuel tank 26 is higher than the pressure in the canister 36-side when the block valve 38 is open, fuel vapor moves toward the canister 36, and the vaporization of fuel in the fuel tank 26 is accelerated. If this situation continues, the value of the fuel liquid surface level SGL detected by the fuel sender gauge 30 decreases. Therefore, the time lag until the value of the fuel liquid surface level SGL detected by the fuel sender gauge 30 decreases is set as the predetermined time Tb.

If the open state of the block valve 38 with the fuel consumption flag Fm=OFF has continued for the predetermined time Tb or more (YES in S138), the fuel consumption flag Fm is set to the ON state (S140). If the block valve 38 is in the closed state (NO in S136), or if the open state of the block valve 38 with the fuel consumption flag Fm=OFF has not continued for the predetermined time Tb (NO in S138), the pros is ended. That is, the value of the fuel consumption flag Fm is not changed. Therefore, if the fuel consumption flag Fm is in the OFF state, the OFF state continues, and if the fuel consumption flag Fm is already in the ON state, the ON state thereof continues.

Figure 4:
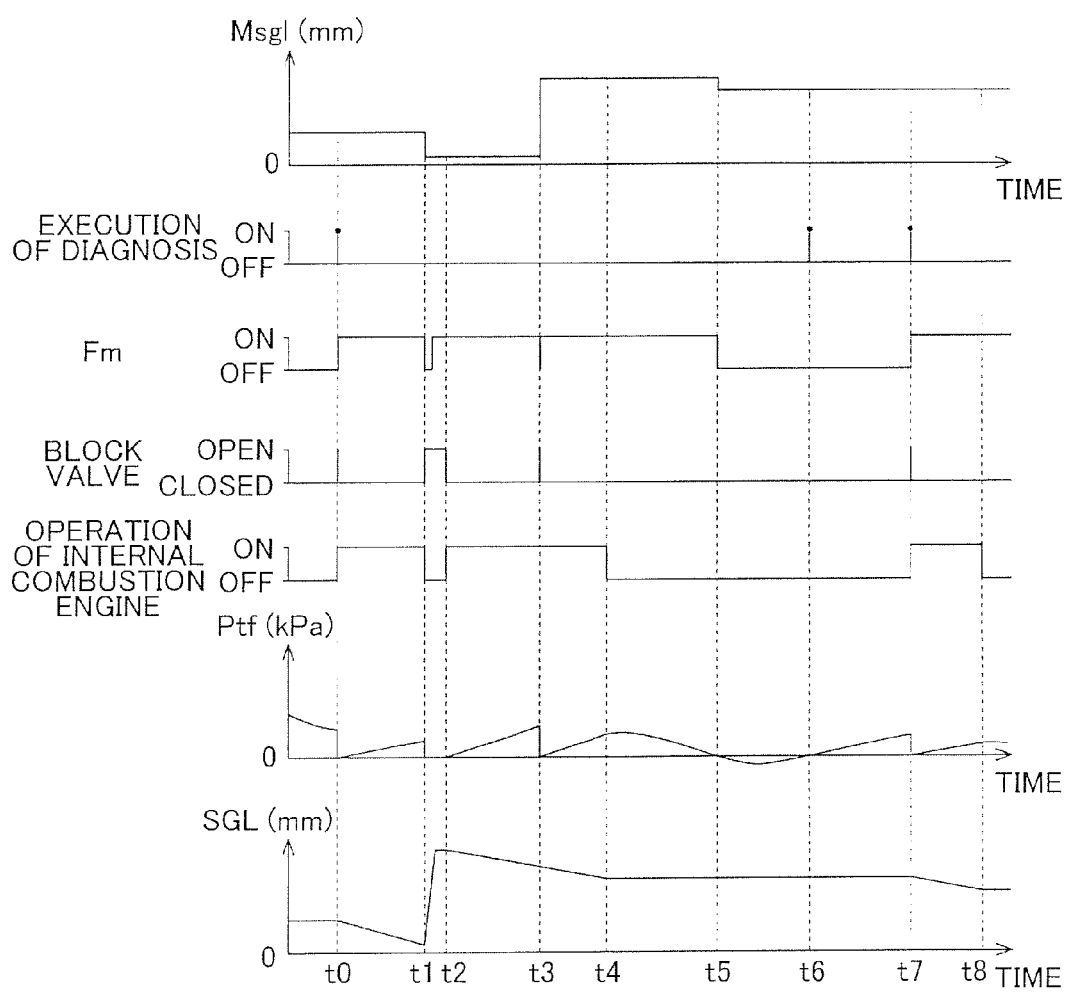
FIG. 4 is a timing chart showing an example of a process performed in the first embodiment.

FIG. 4 shows an example of controls performed in this embodiment. At timing t0, operation of the internal combustion engine 2 starts. It is assumed that, prior to that timing, the vehicle was in the stopped state after traveling in the EV travel state, and the block valve 38 was not opened. Therefore, at timing t0, the state of the fuel consumption flag Fm is the OFF state.

At timing t0, the purge control starts together with the start of the operation of the internal combustion engine 2. In association with the purge control, since it has just been detected that the tank internal pressure Ptf is high, the ECU 70 opens the block valve 38 by using the electromagnetic valve 38a to release pressure from the fuel tank 26. This operation brings about the tank internal pressure Ptf=0 kPa (i.e., the tank internal pressure Ptf becomes 0 kPa due to the operation).

Therefore, an affirmative determination is made in step S102 (YES in step S102) in the liquid submerged portion fuel leakage diagnostic process (FIG. 2). Furthermore, if the certain time or more has elapsed after the stored value Msg1 is set (YES in S104), evaluation is performed using Expression 1 (S108) since the fuel consumption flag Fm is in the OFF state (NO in S106) as mentioned above. That is, the diagnosis is executed, as indicated by ON in the diagnosis execution part in FIG. 4.

If there is no difference between the stored value Msg1 and the fuel liquid surface level SGL (NO in S108), the normality determination is made regarding leakage from the liquid submerged portion (S110), and the stored value Msg1 is updated to the present fuel liquid surface level SGL (S114), and the fuel consumption flag Fm is set to the OFF state (actually, since the fuel consumption flag Fm is already in the OFF state, the present flag value is maintained) (S116). Then, the process is ended.

After that, when the operation of the internal combustion engine 2 continues for the predetermined time Ta, an affirmative determination is made in step S132 (YES in step S132) and an affirmative determination is made in step S134 (YES in step S134) in the fuel consumption detection process (FIG. 3), so that the fuel consumption flag Fm is set to the ON state (S140). Thus, the fuel consumption flag Fm is set to the ON state immediately in a short time after the internal combustion engine 2 starts operating.

After that, as the operation of the internal combustion engine 2 continues with the block valve 38 in the closed state, the tank internal pressure Ptf increases. Therefore, the stored value Msg1 is not updated and the state of the fuel consumption flag Fm is not returned to the OFF state unless the block valve 38 is opened and the tank internal pressure Ptf becomes 0 kPa (Ptf=0 kPa).

At timing t1, the internal combustion engine 2 is stopped and the block valve 38 is opened for refueling. Therefore, the tank internal pressure becomes 0 kPa (Ptf=0 kPa) (YES in S102), so that it is determined whether the certain time or more has elapsed after the stored value Msg1 is set (S104).

At this time, the certain time or more has elapsed following the previous storing timing (t0) (YES in S104), and therefore, it is determined whether the fuel consumption flag Fm is in the ON state (S106). At this time, the fuel consumption flag Fm is in the ON state (YES in S106). That is, due to the fuel consumption occurring between timing t0 and timing t1, the present fuel liquid surface level SGL is set as the stored value Msg1 (S114) without executing the liquid submerged portion leakage diagnosis (S108 to S112), and the state of the fuel consumption flag Fm is returned to the OFF state (S116). Then, the process is ended.

Due to this, the state of the fuel consumption flag Fm temporarily becomes the OFF state after timing t1. However, in the second and later cycles of the liquid submerged portion fuel leakage diagnostic process (FIG. 2) during refueling, an affirmative determination is made in step S102

(YES in step S102) and then it is determined that the certain time or more has not elapsed after the immediately previous storing of the stored value Msg1 (NO in S104). Then, the process is ended. Therefore, the liquid submerged portion leakage diagnosis (S108 to S112) is not performed during refueling.

After the refueling ends, the internal combustion engine 2 starts operating at timing t2. After that, the tank internal pressure Ptf gradually rises as the fuel temperature rises. Then, when the tank internal pressure Ptf becomes high during the purge control at timing t3, as process of opening the block valve 38 by using the electromagnetic valve 38a is performed. This is a pressure relief process performed in advance in order to shorten the waiting time for pressure relief of the tank internal pressure Ptf at the time of refueling.

At this time, the tank internal pressure Ptf becomes 0 kPa (Ptf=0 kPa) (YES in S102), and the certain time or more has elapsed following the storing of the stored value Msg1 (YES in S104). Therefore, it is determined whether the fuel consumption flag Fm is in the ON State (S106).

At this time, the internal combustion engine 2 is in operation and the fuel consumption flag Fm is already in the ON state (YES in S106). Therefore, the liquid submerged portion leakage diagnosis (S108 to S112) is not performed, and the present fuel liquid surface level SGL is set as the stored value Msg1 (S114), and then the fuel consumption flag Fm is set to the OFF state (S116). Then, the process is ended.

After that, since the certain time has not elapsed following the storing of the stored value Msg1 (NO in S104) and also since the tank internal pressure Ptf subsequently increases (NO in S102), so that neither the liquid submerged portion leakage diagnosis (S108 to S112) nor the update of the stored value Msg1 (S114) is performed. During this time, since the internal combustion engine 2 continues operating (YES in S132 and YES in S134), the fuel consumption flag Fm is set to the ON state (S140).

It is assumed that at timing t4, the internal combustion engine 2 stops and the EV traveling starts (i.e., the vehicle starts traveling in the EV travel state). Due to this, the fuel temperature in the fuel tank 26 decreases, and the fuel vapor pressure accordingly decreases. Therefore, while the vehicle is traveling in the EV travel state, the tank internal pressure Ptf becomes 0 kPa (Ptf=0 kPa) at timing t5 (YES in S102).

At timing t5, the certain time or more has elapsed following the setting of the stored value Msg1 (timing t3) (YES in S104) and the fuel consumption flag Fm is already in the ON state (YES in S106), so that the present fuel liquid surface level SGL is set as the stored value Msg1 (S114) and the fuel consumption flag Fm is set to the OFF state (S116). Then, the process is ended.

However, since the vehicle is in the EV travel state, the internal combustion engine 2 is not in operation (NO in S132), and the block valve 38 is not in the open state (NO in S136). Therefore, the fuel consumption flag Fm is maintained in the OFF state in the fuel consumption detection process (FIG. 3).

In the second and later cycles of the liquid submerged portion fuel leakage diagnostic process (FIG. 2), when the certain time or more has not elapsed following the update of the stored value Msg1 at timing t5 (NO in S104), neither the liquid submerged portion leakage diagnosis (S108 to S112) nor the update of the stored value Msg1 (S114) is performed even if the tank internal pressure Ptf is 0 kPa (YES in S102). In FIG. 4, after timing t5, the tank internal pressure Ptf lower than 0 kPa (Ptf<0 kPa), so that a negative determination continues to be made in step S102. Therefore, neither the liquid submerged portion leakage diagnosis (S108 to S112) nor the update of the stored value Msg1 (S114) is performed.

Then, when the tank internal pressure Ptf becomes 0 kPa (Ptf=0 kPa) (YES in S102) at timing t6 due to change in the fuel temperature Tf, the certain time or more has elapsed following the update of the stored value Msg1 at timing t5 (YES in S104), so that it is determined whether the fuel consumption flag Fm is in the ON state (S106). At this time, since the fuel consumption flag Fm is in the OFF state (NO in S106), that is since there is no consumption of fuel in the fuel tank 26 during the period from timing t5 to timing t6, the liquid submerged portion leakage diagnosis (S108 to S112) is performed.

That is, evaluation is performed using Expression 1 (S108). If Expression 1 is satisfied (YES in S108), the abnormality determination is made regarding leakage from the liquid submerged portion (i.e., it is determined that there is fuel leakage from the liquid submerged portion) (S112). On the other hand, if Expression 1 is not satisfied (NO in S108), the normality determination is made regarding leakage from the liquid submerged portion (i.e., it is determined that there is no fuel leakage from the liquid submerged portion) (S110).

Then, the stored value Msg1 is updated (S114) and the fuel consumption flag Fm is set to the OFF state (S116). After that, the process is ended. Subsequently, at timing t7, the travel state switches to the HV travel state, and operation of the internal combustion engine 2 is performed (t7 to t8). At timing t7, the internal combustion engine 2 starts operating, and the purge control is started together with the start of the operation of the internal combustion engine 2. In association with the purge control, since it has been detected that the tank internal pressure Ptf is high, the ECU 70 opens the block valve 38 by using the electromagnetic valve 38a to release the pressure from the fuel tank 26. Due to this, the tank internal pressure Ptf becomes 0 kPa (Ptf=0 kPa).

Therefore, before the fuel consumption flag Fm is set to the ON state (S140) in the fuel consumption detection process (FIG. 3), an affirmative determination is made in step S102, and an affirmative determination is made in step S104 since the certain time or more has elapsed following the previous diagnosis, and a negative determination is made in step S106 since the fuel consumption flag Fm is in the OFF state in the liquid submerged portion fuel leakage diagnostic process (FIG. 2). Hence, the liquid submerged portion leakage diagnosis (S108 to S112) can be performed as stated above.

Then, when the predetermined time Ta elapses (YES in S134), the fuel consumption flag Fm is set to the ON state immediately (S140).

In the above-described configuration, the ECU 70 may be regarded as a reference-state liquid level extraction portion, a fuel consumption detection portion and a fuel leakage diagnostic portion in the liquid submerged portion fuel leakage diagnostic apparatus. The process of extracting the detected value of the fuel liquid surface level SGL that is used as the stored value Msg1 or used in Expression 1 if an affirmative determination is made in step S102 in the liquid submerged portion fuel leakage diagnostic process (FIG. 2) may be regarded as a process as the reference-state liquid level extraction portion, and the fuel consumption detection process (FIG. 3) may be regarded as a process as the fuel consumption detection portion, and the process of steps S106 to S112 may be regarded as a process as the fuel leakage diagnostic portion.

(Effects of First Embodiment) (1) In the case where the tank internal pressure Ptf is equal to a reference internal pressure (atmospheric pressure: 0 kPa), the amount of strain (deformation) of the fuel tank 26 caused by the differential pressure between the outside and the inside of the fuel tank 26 is a constant amount, and the internal volume of the fuel tank 26 is kept constant. Therefore, if the internal combustion engine 2 is not operated and there is no outflow of fuel vapor from the fuel tank 26 due to vaporization and therefore there is no consumption of fuel in the fuel tank 26, or if an extremely small amount of fuel in the fuel tank 26 is consumed and therefore substantially no consumption is detected, the value of the liquid level detected by the fuel sender gauge 30 (fuel liquid surface level SGL) remains constant. If the fuel liquid surface level SGL changes, that is, decreases in the same situation, it can be determined that the fuel liquid surface level SGL has decreased due to occurrence of fuel leakage from the liquid submerged portion of the fuel tank 26.

Hence, with regard to two values of the fuel liquid surface level SGL (one of which is the stored value Msg1) extracted as the reference-state liquid levels when the tank internal pressure Ptf is substantially equal to the atmospheric pressure, the comparison of the two values of the fuel liquid surface level SGL is performed using Expression 1 (S108) if fuel consumption is not detected (Fm=OFF) during the period between the timings at which the two values of the fuel liquid surface consumption are extracted (NO in S106). Due to this comparison, the presence or absence of fuel leakage from the liquid submerged portion can be diagnosed (S110 or S112).

That is, if there is no change (difference) between the two values of the fuel liquid surface level SGL, it can be determined that there is no fuel leakage from the liquid submerged portion of the fuel tank 26, and if the fuel liquid surface level SGL has decreased, it can be determined that there is fuel leakage from the liquid submerged portion of the fuel tank 26.

This makes it possible to accurately diagnose the presence or absence of fuel leakage from the liquid submerged portion, which is impossible in the related-art leak diagnostic system that detects fuel vapor leakage from the upper space 26a above the fuel liquid surface based on change in pressure.

Second Embodiment

Configuration of Second Embodiment

In this embodiment, the ECU 70 executes a purge-system leak diagnostic process. A general content of the purge-system leak diagnostic process is as follows.

The purge-system leak diagnostic process is executed when a predetermined time, for example, about several hours, has elapsed after the state becomes a ready-off state. First, in the case where the tank internal pressure Ptf is in a region near the atmospheric pressure, the pressure in the canister 36 is reduced by using the pump module 42 for leak diagnosis with the purge control valve 50 and the block valve 38 being closed, and change in the internal pressure Pc of the canister 36 is measured by the pressure sensor 42b provided for the canister 36. On the basis of the pattern of the change, it is diagnosed (determined) whether there is leak from the canister 36. If the leak diagnosis on the canister 36 results in a normality determination (i.e., if it is determined that there is no leak from the canister 36), the block valve 38 is opened using the electromagnetic valve 38a, and the pressure in the fuel tank 26 is reduced by the pump module 42 for leak diagnosis, via the canister 36, and change in the internal pressure Pc is measured by the pressure sensor 42b provided for the canister 36. On the basis of the pattern of the change, it is diagnosed (determined) whether there is leak from the fuel tank 26.

In the case where the tank internal pressure Ptf is a pressure apart from the range near the atmospheric pressure before the block valve 38 is opened, it is determined that there is no fuel vapor leak from the upper space 26a of the fuel tank 26, and therefore the normality determination is made without executing the above-described process of reducing the pressure in the fuel tank 26.

Figure 5:
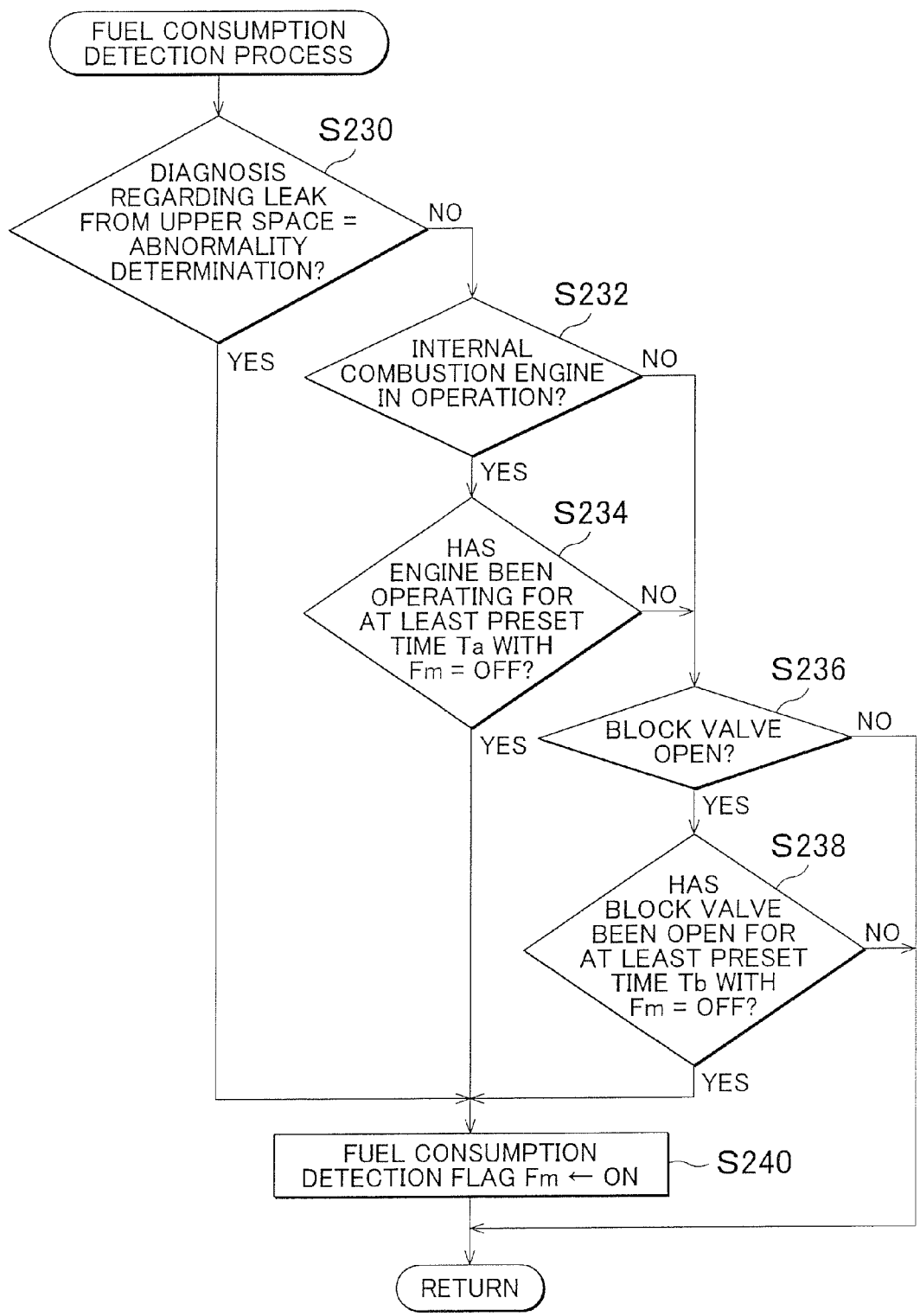
FIG. 5 is a flowchart a fuel consumption detection process executed by an ECU in a second embodiment of the invention.

Furthermore, the ECU 70 executes a process shown in FIG. 5 instead of the fuel consumption detection process shown in FIG. 3. Other configurations (as shown in FIGS. 1 and 2) are the same as those of the first embodiment. Therefore, the following description will be made with reference to FIGS. 1 and 2 as well.

Operation of Second Embodiment

Operation of this embodiment will be described with reference to the fuel consumption detection process shown in FIG. 5. After the process shown in FIG. 5 starts, it is determined whether the result of the leak diagnosis regarding the upper space 26a of the fuel tank 26 is an abnormality determination in the purge-system leak diagnostic process in which the fuel vapor leak diagnosis is performed as described above, that is, whether there is leak of fuel vapor from a region above the liquid submerged portion in the fuel tank 26 (S230).

If a leak abnormality determination is not made with regard to the upper space 26a of the fuel tank 26 (i.e., if it is determined that there is no leak of fuel vapor) (NO in S230), the process of steps S232 to S240 is executed. The process of steps S232 to S240 is the same as the process shown in FIG. 3, that is, the same as the process described with reference to steps S132 to S140.

Therefore, if neither the fuel consumption due to operation of the internal combustion engine 2 nor the fuel consumption due to the opening of the block valve 38 occurs (a negative determination is made in S232 or S234, and a negative determination is made in S236 or S238), the process is ended. If at least one of the fuel consumption due to operation of the internal combustion engine 2 and the fuel consumption due to the opening of the block valve 38 occurs (an affirmative determination is made in S212 and S234, or an affirmative determination is made in S236 and S238), the fuel consumption flag Fm is set to the ON state (S240).

Then, in the case where a leak abnormality determination is made with regard to the upper space 26a (i.e., in the case where it is determined that there is leak of fuel vapor) (YES in S230), the fuel consumption flag Fm is set to the ON state (S240). It is to be noted herein that, unlike the case where the internal combustion engine 2 is in operation (YES in S232) or the case where the block valve 38 is in the open state (YES in S236), the fuel consumption flag Fm is set to the ON state immediately after the fuel vapor leak abnormality determination is made (YES in S230). The fuel vapor leak abnormality determination is usually made in the diagnosis after a long time elapses without operation of the internal combustion engine 2. Therefore, the fuel vapor leak abnormality determination in the diagnosis suggests that fuel vapor leak has caused fuel consumption and the amount of the fuel consumption is an amount that influences the value detected by the fuel sender gauge 30.

Figure 6:
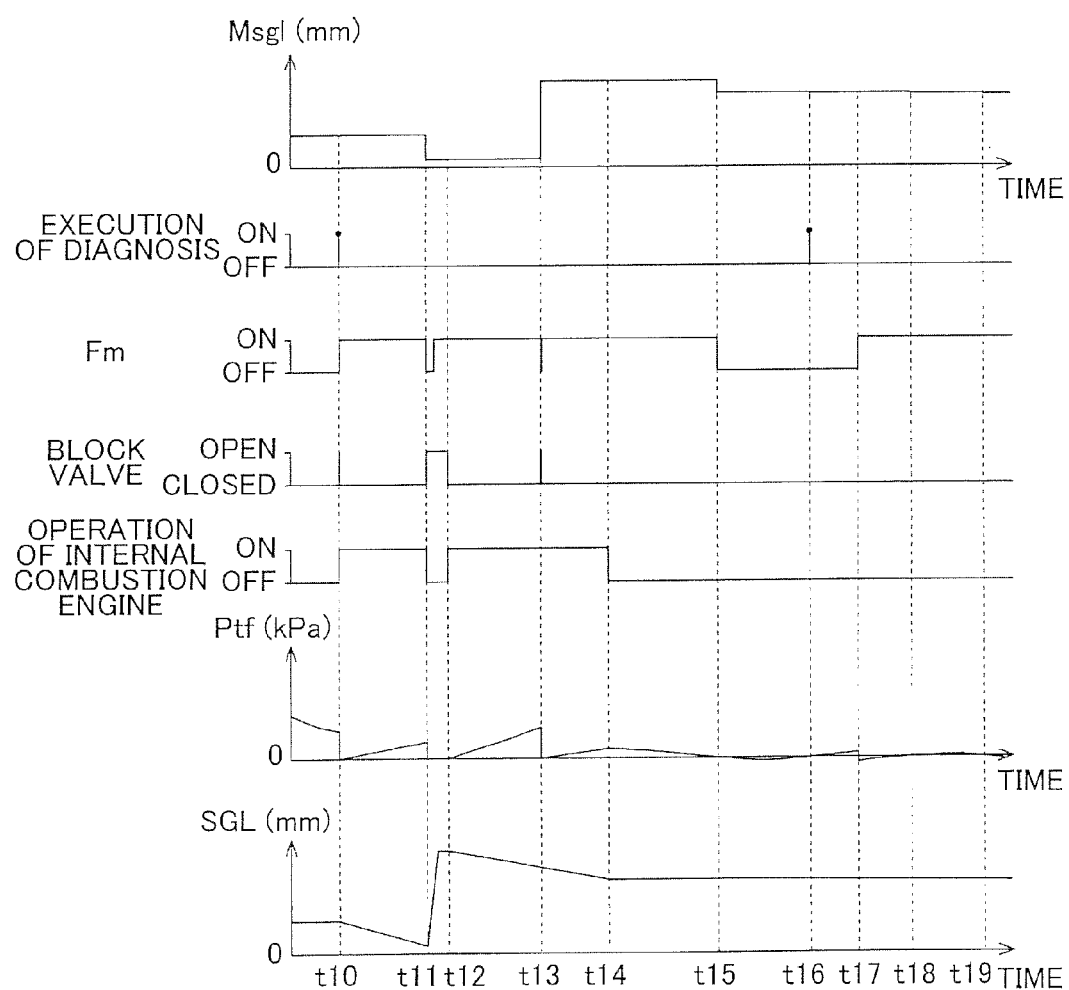
FIG. 6 is a timing chart showing an example of a process formed in the second embodiment.

FIG. 6 shows an example of processes performed in the embodiment. In this example, from timing t10 to timing t16, an abnormality determination regarding the fuel vapor leak from the upper space 26a of the fuel tank 26 is not made, or the normality determination regarding the fuel vapor leak from the upper space 26a of the fuel tank 26 is maintained, and therefore an affirmative determination is always made in step S230 in the fuel consumption detection process (FIG. 5). Thus, changes in this period are substantially the same as the changes shown in FIG. 4, which have been described above in the first embodiment.

Therefore, at timing t10 and timing t16, evaluation is performed using Expression 1 (S108), and if Expression 1 is satisfied (YES in S108), an abnormality determination regarding leakage from the liquid submerged portion is made (i.e., it is determined that there is fuel leakage from the liquid submerged portion) (S112), and if Expression 1 is not satisfied (NO in S108), a normality determination regarding leakage from the liquid submerged portion is made (i.e., it is determined that there is no fuel leakage from the liquid submerged portion) (S110).

However, at timing t17, the above-described purge-system leak diagnostic process is executed after the internal combustion engine 2 has stopped. At this time, it is determined that the upper space 26a of the fuel tank 26 has a fuel vapor leak abnormality (YES in S230). That is, it is determined that a hole with a certain size or larger exists in a portion of the outer shell of the fuel tank 26 which corresponds to the upper space 26a.

Therefore, the fuel consumption flag Fm is set to the ON state (S240). After that, in the liquid submerged portion fuel leakage diagnostic process (FIG. 2), it is determined in step S106 that the fuel consumption flag Fm is in the ON state (YES in S106) after it is determined in step S102 that the tank internal pressure Ptf is 0 kPa (YES in S102) and it is determined in step S104 that the certain time or more has elapsed after the stored value Msg1 is set (YES in S104). Therefore, the stored value Msg1 is updated (S114), and the fuel consumption flag Fm is returned to the OFF state (S116). However, since the abnormality determination regarding fuel vapor leak has not been cleared (YES in S230), the fuel consumption flag Fm is immediately returned to the ON state (S240).

Therefore, as long as the state in which the abnormality determination regarding fuel vapor leak is maintained continues, it is determined that consumption of fuel in the fuel tank 26 continues due to fuel vapor leak (YES in S106), and the liquid submerged portion leakage diagnosis (S108 to S112) is not performed.

In the above-described configuration, the ECU 70 may be regarded as the reference-state liquid level extraction portion, the fuel consumption detection portion, the fuel leakage diagnostic portion and a fuel vapor leak diagnostic portion. The process of extracting the detected value of the fuel liquid surface level SGL that is used as the stored value Msg1 or used in Expression 1 if an affirmative determination is made in step S102 in the liquid submerged portion fuel leakage diagnostic process (FIG. 2) may be regarded as a process as the reference-state liquid level extraction portion, and the fuel consumption detection process (FIG. 5) may be regarded as a process as the fuel consumption detection portion, and the process of steps S106 to S112 may be regarded as a process as the fuel leakage diagnostic portion. The above-described purge-system leak diagnostic process may be regarded as a process as the fuel vapor leak diagnostic portion.

Effects of Second Embodiment (1) In the fuel consumption detection process (FIG. 5), the determination regarding fuel consumption due to leak of fuel vapor from the upper space 26a is performed (S230) in addition to the determination regarding the fuel consumption due to operation of the internal combustion engine 2 (S232 and S234) and the determination regarding fuel consumption due to outflow of fuel vapor into the vaporized fuel passage 35 while the block valve 38 is in the open state (S236 and S238).

Therefore, by taking into account fuel vapor leak from the upper space 26a, it is possible to more accurately perform the diagnosis regarding fuel leakage from the liquid submerged portion, in addition to achieving the effects achieved by the first embodiment.

Third Embodiment

Configuration of Third Embodiment

In this embodiment, the ECU 70 executes a purge-system leak diagnostic process as described above in the second embodiment.

Figure 7A:
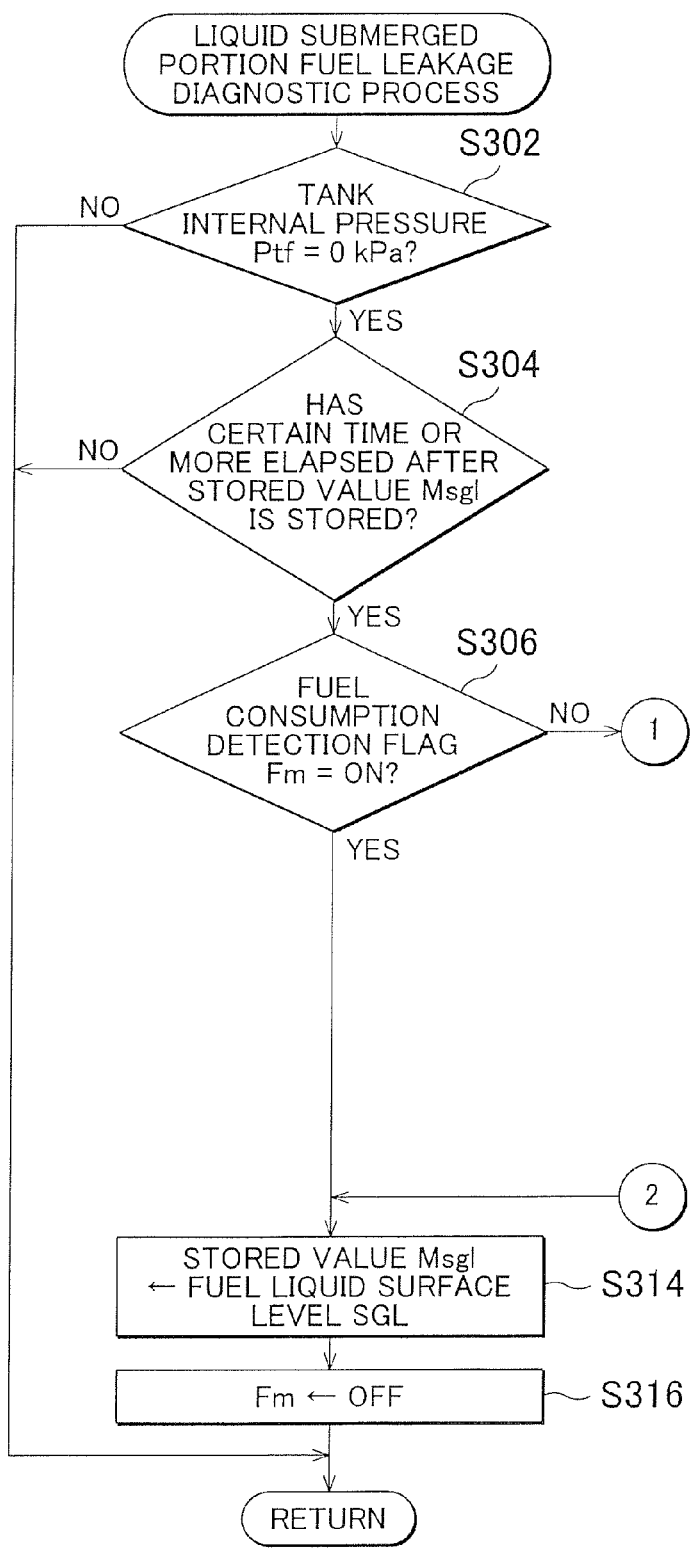
FIGS. 7A and 7B show a flowchart of a liquid submerged portion fuel leakage diagnostic process executed by an ECU in a third embodiment of the invention.
Figure 7B:
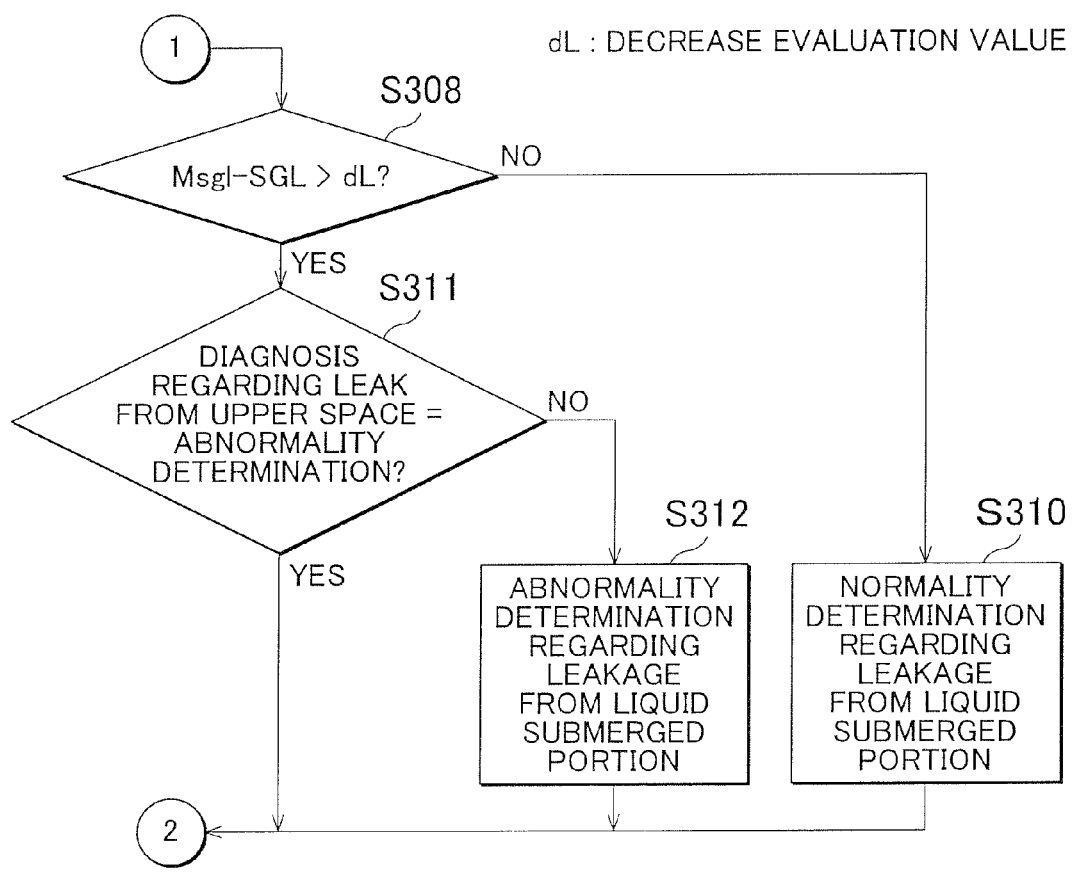

Furthermore, the ECU 70 executes a process shown in FIGS. 7A and 7B instead of the liquid submerged portion fuel leakage diagnostic process shown in FIG. 2. Other configurations (as shown in FIGS. 1 and 3) are the same as those of the first embodiment. Therefore, the following description will be made with reference to FIGS. 1 and 3 as well.

Operation of Third Embodiment

Operation of this embodiment will be described with reference to the liquid submerged portion fuel leakage diagnostic process shown in FIGS. 7A and 7B. The process excluding step S311 in FIGS. 7A and 7B, that is, the process of steps S302 to S310 and S312 to S316, is the same as the process of steps S102 to S116 shown in FIG. 2. Since the process shown in FIGS. 7A and 7B is different from the process shown in FIG. 2 only in the process (S311) that is performed when Expression 1 is satisfied (YES in S308), the case where Expression 1 is satisfied will be described below.

If Expression 1 is satisfied (YES in S308), it is determined whether the result of the diagnosis regarding leak from the upper space 26a of the fuel tank 26 is an abnormality determination in the purge-system leak diagnostic process in which the diagnosis regarding leak of fuel vapor is performed as described above (S311).

If a leak abnormality determination is not made with regard to the upper space 26a (No in S311), the amount of fuel has decreased while consumption of fuel in the fuel tank 26 has not occurred (Fm=OFF) (NO in S306), and therefore an abnormality determination regarding leakage from the liquid submerged portion is made, that is, it is determined that there is fuel leakage in the liquid submerged portion of the fuel tank 26 (S312). Step S312 is the same process as step S112 in FIG. 2.

If a leak abnormality determination is made with regard to the upper space 26a (YES in S311), the ECU 70 does not make the abnormality determination regarding leakage from the liquid submerged portion (S312) although Expression 1 is satisfied (YES in S308), and the ECU 70 immediately updates the stored value Msg1 (S314) and sets the fuel consumption flag Fm to the OFF state (S316). After that, the process is ended.

If Expression 1 is not satisfied (NO in S308), there has not been any actual decrease in the amount of fuel while consumption of fuel in the fuel tank 26 has not occurred (Fm=OFF) (NO in S306) and therefore a normality determination regarding leakage from the liquid submerged portion is made, that is, it is determined that there is no fuel leakage from the liquid submerged portion of the fuel tank 26 (S310). Step S310 is the same process as step S110 in FIG. 2.

Figure 8:
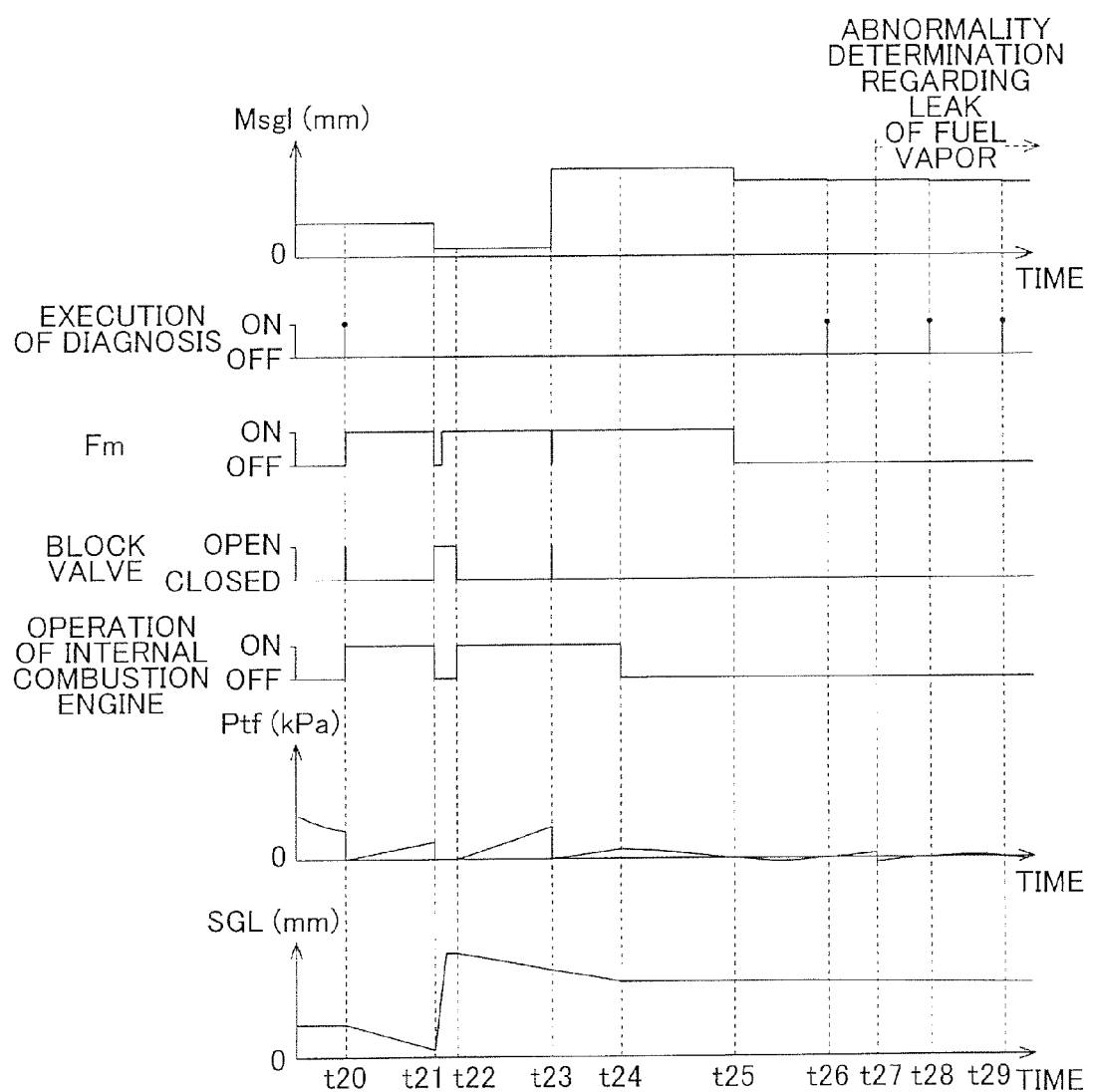
FIG. 8 is a timing chart showing an example of a process performed in the third embodiment.

Details of the other processes are as described above in the first embodiment. FIG. 8 shows an example of processes performed in this embodiment. It is to be noted that changes during the period of timing t20 to timing t27 are the same as changes during the period of timing t10 to timing t17 in FIG. 6, which have been described above in the second embodiment.

After the internal combustion engine 2 stops, the purge-system leak diagnostic process described above is executed at timing t27. At this time, it is determined that a fuel vapor leak abnormality is occurring in the upper space 26a of the fuel tank 26 (i.e., there is fuel vapor leak from the upper space 26a of the fuel tank 26) (YES in S311).

Therefore, from this time on, the liquid submerged portion leakage diagnosis (S308 to S312) is performed (t28 and t29) although only the abnormality determination regarding leakage from the liquid submerged portion (S312) is excluded.

In the above-described configuration, the ECU 70 may be regarded as the reference-state liquid level extraction portion, the fuel consumption detection portion, the fuel leakage diagnostic portion and the fuel vapor leak diagnostic portion. The process of extracting the detected value of the fuel liquid surface level SGL that is used as the stored value Msg1 or used in Expression 1 if an affirmative determination is made in step S302 in the liquid submerged portion fuel leakage diagnostic process (FIGS. 7A and 7B) may be regarded as a process as the reference-state liquid level extraction portion, and the fuel consumption detection process (FIG. 3) may be regarded as a process as the fuel consumption detection portion, and the process of steps S306 to S312 may be regarded as a process as the fuel leakage diagnostic portion. The above-described purge-system leak diagnostic process may be regarded as a process as the fuel vapor leak diagnostic portion.

Effects of Third Embodiment (1) In the case where the presence of the fuel vapor leak abnormality with regard to the upper space 26a is determined (YES in S311), even if Expression 1 is satisfied, that is, even if the fuel liquid surface level SGL has decreased, it is not clear whether the decrease in the fuel liquid surface level SGL is a decrease in the liquid level resulting from fuel vapor leak or a decrease in the liquid level resulting from fuel leakage from the liquid submerged portion of the fuel tank 26.

However, in the case where the fuel liquid surface level SGL has not decreased, that is, in the case where Expression 1 is not satisfied, it is clear that even if the fuel vapor leak abnormality is present, the amount of fuel vapor leak is not so large as to affect the fuel liquid surface level SGL.

Therefore, in the liquid submerged portion fuel leakage diagnostic process (FIGS. 7A and 7B), if it is determined in the purge-system leak diagnostic process that there is fuel vapor leak abnormality (YES in S311), the ECU 70 does not make the determination that there is the fuel leakage abnormality in the liquid submerged portion (i.e., the ECU 70 does not make the determination that there is fuel leakage from the liquid submerged portion) (S312). However, it is allowed to make a normality determination that there is no fuel leakage from the liquid submerged portion (i.e., the ECU 70 may make the determination that there is no fuel leakage from the liquid submerged portion) (S310). This increases the frequency of the accurate fuel leakage diagnosis with regard to the liquid submerged portion.

Fourth Embodiment

Configuration of Fourth Embodiment

In this embodiment, the ECU 70 performs the fuel leakage diagnosis with regard to the liquid submerged portion by appropriately performing comparison with the stored value Msg1 even if the tank internal pressure Ptf is different from the reference internal pressure, instead of performing the fuel leakage diagnosis with regard to the liquid submerged portion by detecting the fuel liquid surface level SGL at a timing at which the tank internal pressure Ptf becomes equal to the reference internal pressure. Therefore, the ECU 70 this embodiment is different from the ECU in the second embodiment in that the ECU 70 in this embodiment executes a liquid submersed portion fuel leakage diagnostic process shown in FIG. 9 instead of the process shown in FIG. 2. Other configurations (FIGS. 1 and 5) are the same as those of the second embodiment. Therefore, this embodiment will be described with reference to FIGS. 1 and 5 as well.

Operation of Fourth Embodiment

Operation of this embodiment will be described with reference to a liquid submerged portion fuel leakage diagnostic process shown in FIG. 9. After the process starts, the ECU 70 firstly determines whether a certain time or more has elapsed (S402) after the stored value Msg1 is set (S414) and a stored pressure value Mptf is set (S415). Steps S414 and S415 will be described later. This determination process of Step S402 is the same as the process of step S104 in FIG. 2.

If the certain time or more has not elapsed after the stored value Msg1 is set (NO in S402), the process is ended. If the certain time or more has elapsed after the stored value Msg1 is set (YES in S402), the ECU 70 then determines whether the fuel consumption flag Fm is in the ON state (S404). The fuel consumption flag Fm is set to the ON state (S240 in FIG. 5) in the fuel consumption detection process (FIG. 5) described above in the second embodiment when fuel is consumed and fuel consumption is so large as to manifest itself in change in the fuel liquid surface level SGL in the fuel tank 26 (i.e., when fuel consumption changes the fuel liquid surface level SGL in the fuel tank 26). In this process, the fuel consumption flag Fm is set to the OFF state (S416) after the stored value Msg1 and the stored pressure value Mptf have bean set (S414 and S415).

If the fuel consumption flag Fm is in the OFF state (NO in S404), a determination reference value Mx is calculated based on the stored value Msg1 and the stored pressure value Mptf by using Expression 2 below (S406).

$$Mx \leftarrow Msg1 + k*(Ptf - Mptf) \quad \text{(Expression 2)}$$

In this expression, the coefficient k represents a correspondence relation between the fuel liquid surface level SGL in the fuel tank 26 and the tank internal pressure Ptf when there is no fuel leakage from the liquid submerged portion when the fuel leakage from the liquid submerged portion is absent), that is, a normality-time correspondence relation between the fuel liquid surface level SGL and the tank internal pressure Ptf.

Figure 10:
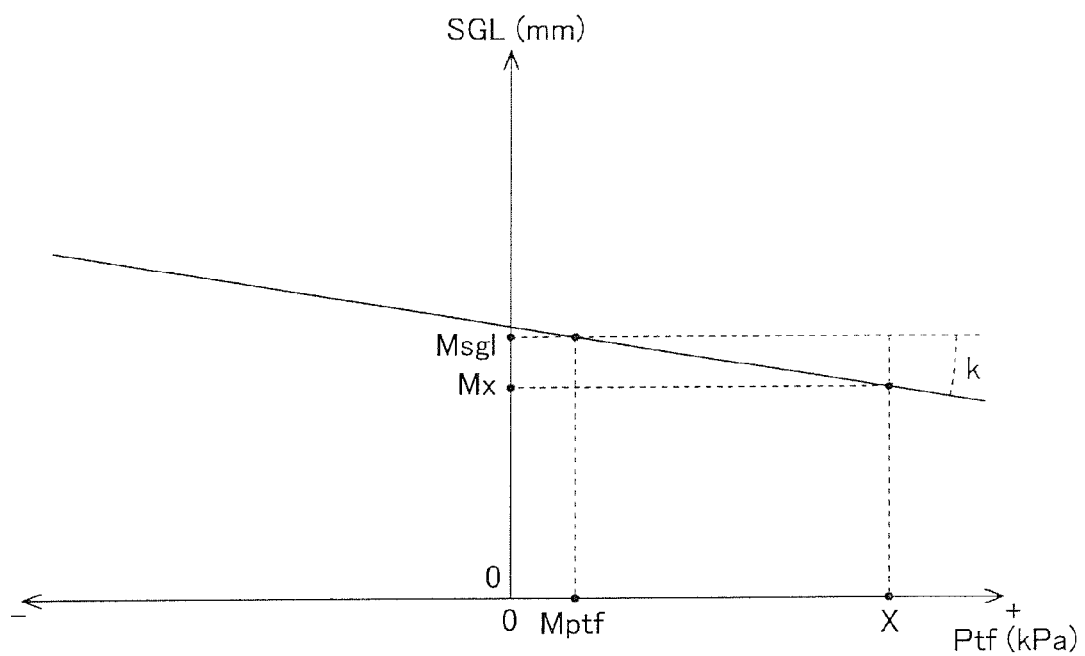
FIG. 10 is a graph showing a relation between the tank internal pressure Ptf and the fuel liquid surface level SGL in the case where a constant amount of fuel exists in the fuel tank.

FIG. 10 shows the fuel liquid swine level SGL that changes depending on the tank internal pressure Ptf when a certain amount of fuel is present in the fuel tank 26. Even when a fixed amount of fuel is present in the fuel tank 26, increase in the tank internal pressure Ptf expands the outer shell of the fuel tank 26 so that apparently the value of the fuel liquid surface level SGL becomes smaller. If the tank internal pressure Ptf decreases, the outer shell of the fuel tank 26 shrinks so that apparently the value of the fuel liquid surface level SGL becomes larger. The slope of the straight line that represents the correspondence relation between the tank internal pressure Ptf and the fuel liquid surface level SGL is set to the coefficient k. Therefore, the coefficient k that represents the normality-time correspondence relation is a negative value.

During the initial period of use of the fuel tank 26, this coefficient k is determined by using the relation between the tank internal pressure Ptf and the fuel liquid surface level SGL by a normality-time relation acquisition process executed by the ECU 70, and the determined coefficient k is stored in a non-volatile memory.

As shown in FIG. 10, provided that the present tank internal pressure Ptf is X (Ptf=X). Expression 2 represents a process in which the stored value Msg1, which is a fuel liquid surface level SGL set when the tank internal pressure Ptf was equal to the stored pressure value Mptf, is converted to a fuel liquid surface level at the present tank internal pressure Ptf of X and the converted fuel liquid surface level is set as a determination reference value Mx.

Therefore, the fuel liquid surface level SGL presently obtained from the fuel sender gauge 30 can be compared with the stored value Msg1. Therefore, evaluation is performed using Expression 3 (S408).

$$Mx-SGL>dL \quad \text{(Expression 3)}$$

The decrease evaluation value dL in Expression 3 is as described above with regard to Expression 1.

If Expression 3 is not satisfied (NO in S408), there is no consumption of fuel in the fuel tank 26 (Fm=OFF) and the amount of fuel has not actually decreased, so that the normality determination regarding leakage from the liquid submerged portion is made (i.e., it is determined that there is no fuel leakage from the liquid submerged portion of the fuel tank 26) (S410).

If Expression 3 is satisfied (YES in S408), the amount of fuel has actually decreased although there is no consumption of fuel in the fuel tank 26 (Fm=OFF), so that the abnormality determination regarding leakage from the liquid submerged portion is made, that is, it is determined that there is fuel leakage from the liquid submerged portion of the fuel tank 26 (S412).

Then, the fuel liquid surface level SGL detected in the present cycle is set as the stored value Msg1 that is set in a non-volatile memory (S414), and, likewise, the tank internal pressure Ptf detected in the present cycle is set as the stored pressure value Mptf that is set in the non-volatile memory (S415). Then, the fuel consumption flag Fm provided in the non-volatile memory is set to the OFF state (S416). After that the process is ended.

If the fuel consumption flag Fm is set to the ON state (YES in S404), the ECU 70 does not execute the above-described diagnostic process (S406 to S412), and sets the presently detected fuel liquid surface level SGL as the stored value Msg1 (S414), sets the presently detected tank internal pressure Ptf as the stored pressure value Mptf (S415), and sets the fuel consumption flag Fm to the OFF state (S416). Then the process is ended.

Figure 11:
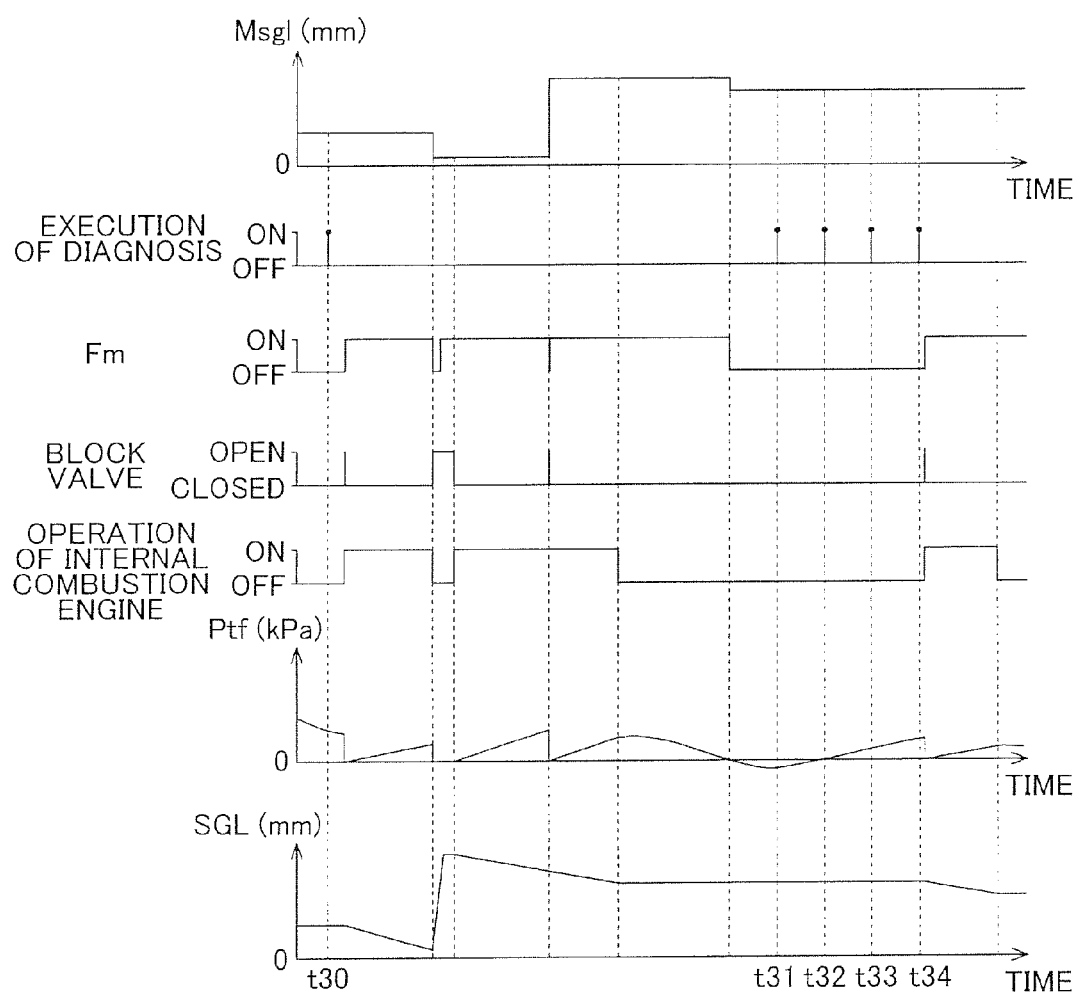
FIG. 11 is a timing chart showing an example of a process performed in the fourth embodiment of the invention.

FIG. 11 is an example of processes performed in this embodiment. In this embodiment, the tank internal pressure Ptf=0 kPa is not a condition for executing the liquid submerged portion fuel leakage diagnosis (S406 to S412), the liquid submerged portion fuel leakage diagnosis (t30 to t34) is performed with high frequency.

In the above-described configuration, the ECU 70 may be regarded as a normality-time relation storage portion, the fuel consumption detection portion, the fuel leakage diagnostic portion and the fuel vapor leak diagnostic portion. A memory configuration of the ECU 70 that stores the coefficient k acquired in the normality-time relation acquisition process may be regarded as the normality-time relation storage portion. The fuel consumption detection process (FIG. 5) executed by the ECU 70 may be regarded as a process as the fuel consumption detection portion, and the liquid submerged portion fuel leakage diagnostic process (FIG. 9) executed by the ECU 70 may be regarded as a process as the fuel leakage diagnostic portion. The above-described purge-system leak diagnostic process may be regarded as a process as the fuel vapor leak diagnostic portion.

Effects of Fourth Embodiment (1) The ECU determines the determination reference value Mx based on the coefficient k, the tank internal pressure Ptf and the stored pressure value Mptf by using Expression 2, compares the present fuel liquid surface level SGL with the determination reference value Mx, and determines the presence or absence of fuel leakage from the liquid submerged portion of the fuel tank 26.

As shown in FIG. 10, when there is no fuel leakage from the liquid submerged portion, the fuel liquid surface level SGL changes according to the tank internal pressure Ptf, and always has a constant relation with the tank internal pressure Ptf. Therefore, this normality-time correspondence relation is stored in the form of the coefficient k, and the normality-time correspondence relation can be used to diagnose the presence or absence of fuel leakage from the liquid submerged portion of the fuel tank 26.

That is, during a period during which fuel consumption is not detected, the presence or absence of fuel leakage from the liquid submerged portion of the fuel tank 26 can be diagnosed on the basis of a plurality of pairs of values of the fuel liquid surface level SGL and the tank internal pressure Ptf, that is, two pairs thereof in this example, by using the above-described normality-time correspondence relation.

Due to this, the presence or absence of fuel leakage from the liquid submerged portion of the fuel tank 26 can be diagnosed by detecting the fuel liquid surface level SGL and the tank internal pressure Ptf, without waiting for the tank internal pressure Ptf to reach a specific state. Thus, it is possible to more frequently diagnose the presence or absence of fuel leakage from the liquid submerged portion of the fuel tank 26 as shown in FIG. 11, in addition to achieving the effects achieved in the second embodiment.

Fifth Embodiment

Configuration of Fifth Embodiment

In this embodiment, a process of setting the coefficient k that is used in the process described above with reference to FIG. 9 in the fourth embodiment is performed during a period during which the result of the liquid submerged portion fuel leakage diagnosis performed in the process described above with reference to FIGS. 2 and 5 in the second embodiment is the normality determination (a period during which it is determined that there is no fuel leakage from the liquid submerged portion).

Figure 9:
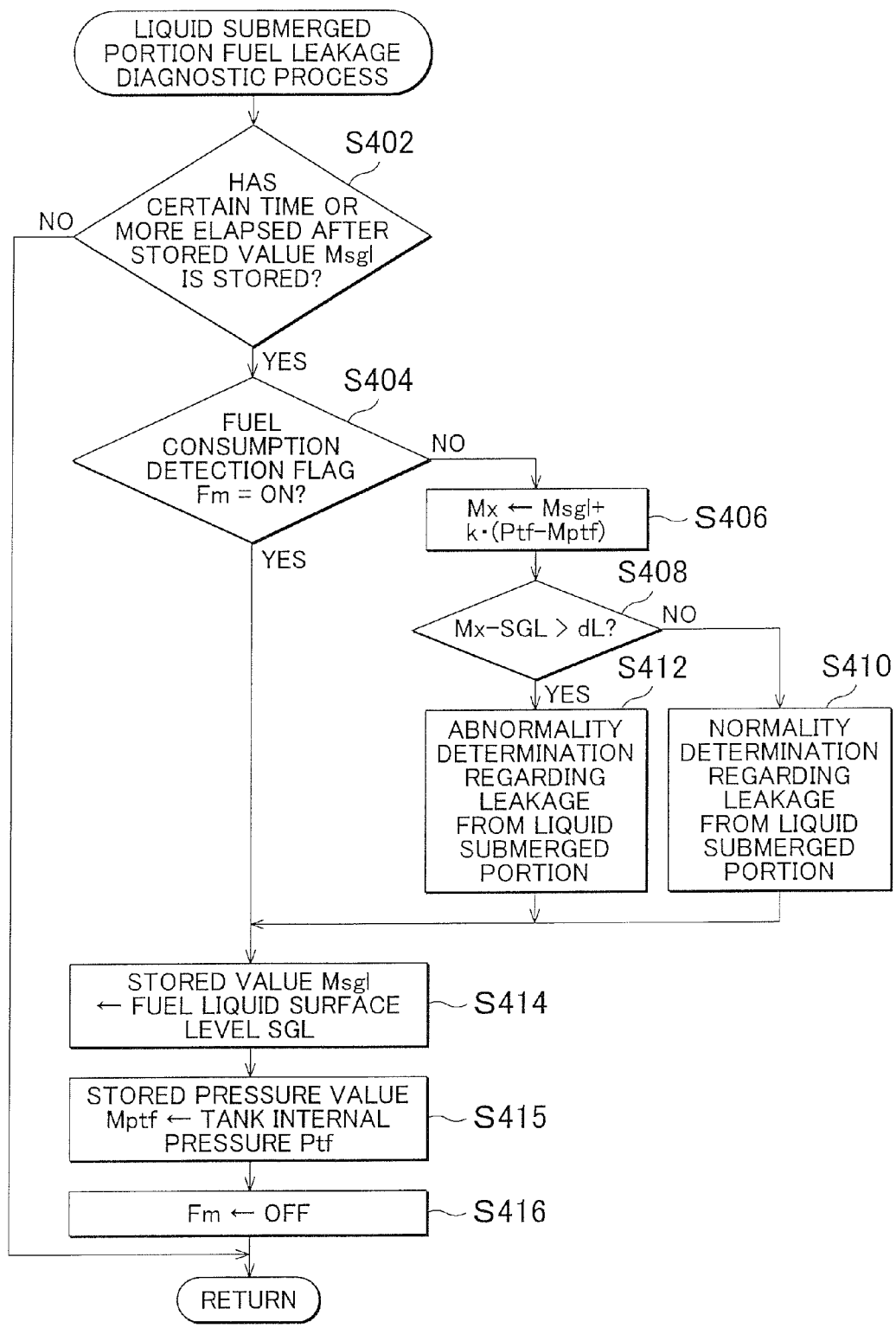
FIG. 9 is a flowchart of a liquid submerged portion fuel leakage diagnostic process executed by an ECU in a fourth embodiment of the invention.
Figure 12A:
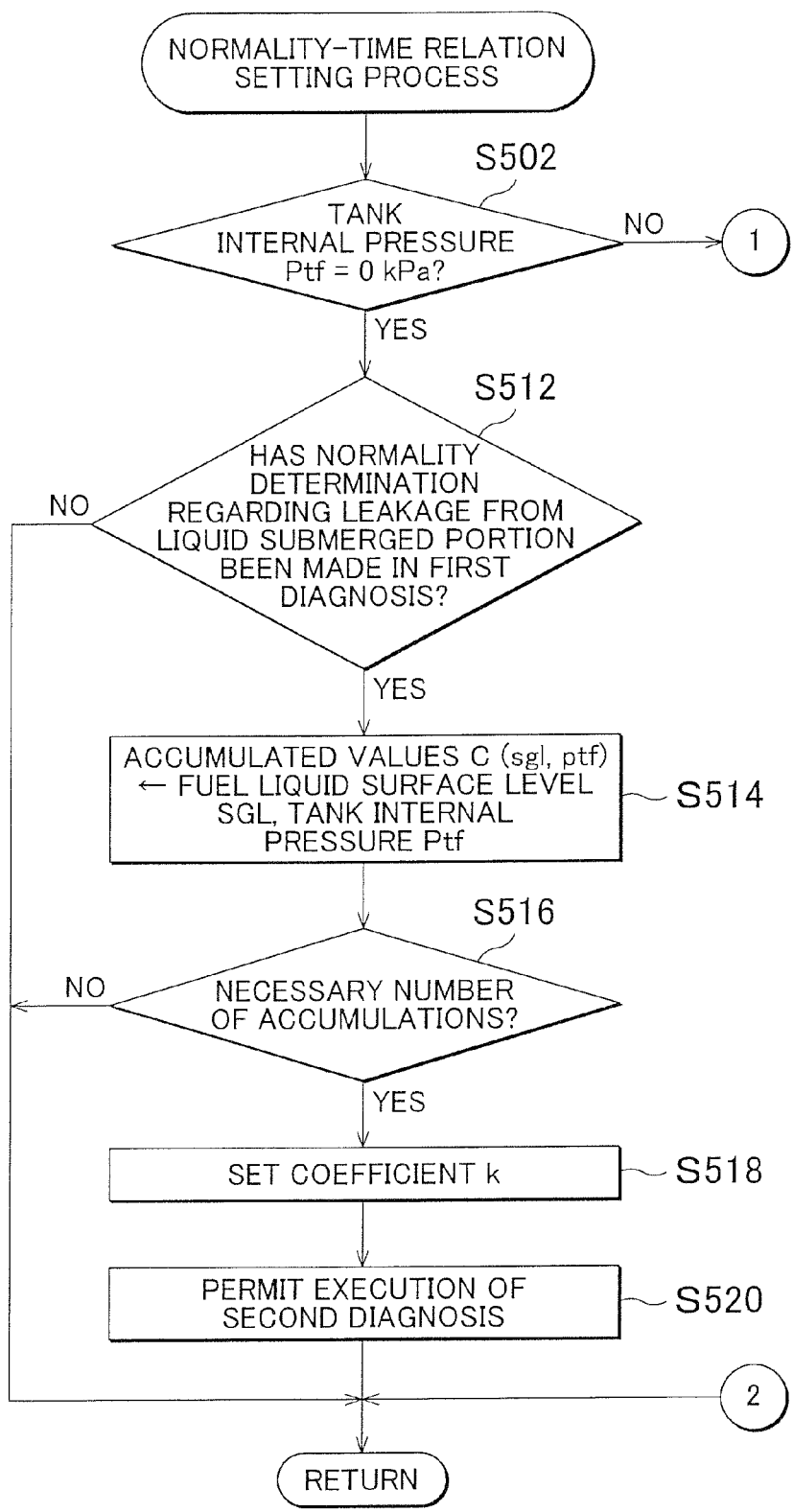
FIGS. 12A and 12B show a flowchart of a normality-time relation setting process executed by an ECU in a fifth embodiment of the invention.
Figure 12B:
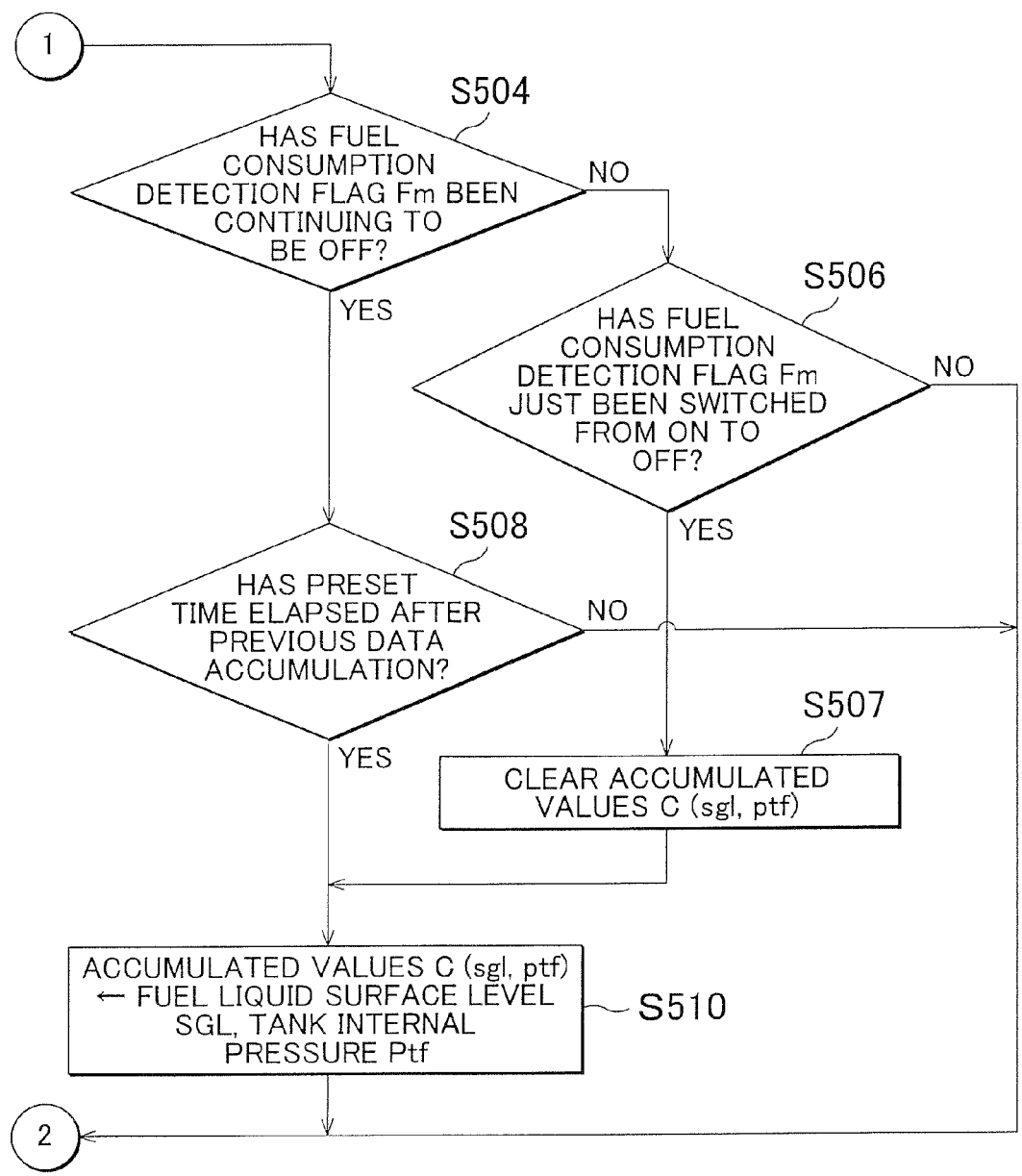

Therefore, the ECU 70 executes a normality-time relation setting process shown in FIGS. 12A and 12B as well as the processes shown in FIGS. 2, 5 and 9. Other configurations are as described above in the second and fourth embodiments. Therefore, this embodiment will be described with reference to FIGS. 1, 2, 5 and 9 as well. Execution of the liquid submerged portion fuel leakage diagnostic process shown in FIG. 9 is prohibited until execution of the process is permitted by the normality-time relation setting process shown in FIGS. 12A and 12B.

Operation of Fifth Embodiment

Operation of this embodiment will be described with reference to the normality-time relation setting process shown in FIGS. 12A and 12B. After this process starts, the ECU 70 firstly determines whether the tank internal pressure Ptf is 0 kPa (Ptf=0 kPa) (S502).

If the tank internal pressure Ptf is not 0 kPa (NO in S502), it is then determined whether the fuel consumption flag Fm has been continuing to be in the OFF state (S504). If the fuel consumption flag Fm is in the ON state or if the fuel consumption flag Fm has just been switched from the ON state to the OFF state (NO in S504), it is then determined whether the fuel consumption flag Fm has just been switched from the ON state to the OFF state (S506).

If it is determined that the fuel consumption flag Fm is in the ON state (NO in S506), the process is ended. Therefore, if the fuel consumption flag Fm is in the ON state, more specifically, if the fuel consumption flag Fm has been in the ON state since the flag Fm is set to the ON state in the fuel consumption detection process (FIG. 5), an accumulation process on accumulated values C (sgl, ptf) as described below is not executed in the normality-time relation setting process (FIGS. 12A and 12B).

If the tank internal pressure Pft becomes 0 kPa, the process as described above in the first embodiment is executed in the liquid submerged portion fuel leakage diagnostic process (FIG. 2). However, in the normality-time relation setting process (FIGS. 12A and 12B), an affirmative determination is made in step S502, it is determined whether the normality determination regarding leakage from the liquid submerged portion has been made (i.e., whether it has been determined that there is no fuel leakage from the liquid submerged portion of the fuel tank 26) in first diagnosis, that is, the liquid submerged portion fuel leakage diagnostic process (FIG. 2) (S512). However, in the liquid submerged portion fuel leakage diagnostic process (FIG. 2), the normality determination regarding leakage from the liquid submerged portion has not been made (i.e., it has not been determined that there is no fuel leakage from the liquid submerged portion) (NO in S512), and therefore, the process is ended.

However, in the case where the tank internal pressure Ptf is 0 kPa (Ptf=0 kPa), if an affirmative determination is made in each of steps S102, S104 and S106 in the liquid submerged portion fuel leakage diagnostic process (FIG. 2), the stored value Msg1 is set (S114) and the fuel consumption flag Fm is set to the OFF state (S116).

After that, in the case where the fuel consumption detection process (FIG. 5) proceeds and the fuel consumption flag Fm is not set to the ON state, if the tank internal pressure Ptf becomes a value that is not 0 kPa (Ptf≠0 kPa) (NO in S502), the accumulated values C (sgl, ptf) set in the non-volatile memory are cleared (S507) since the fuel consumption flag Fm has just been switched to the OFF state (NO in S504 and YES in S506), during an early period. Then, data regarding a pair of the present fuel liquid surface level SGL and the present tank internal pressure Ptf is accumulated in the accumulated values C (sgl, ptf) (S510).

In the next execution cycle of the normality-time relation setting process (FIGS. 12A and 12B), since the fuel consumption flag Fm has been continuing to be in the OFF state (YES in S504), it is then determined whether a preset time has elapsed after the previous data accumulation in the accumulated values C (sgl, ptf) (i.e., after the data is previously accumulated in the accumulated values C (sgl, ptf)) (S508). If the preset time has not elapsed (NO in S508), the process is ended.

If the preset time has elapsed (YES in S508), the data regarding a pair of the present fuel liquid surface level SGL and the present tank internal pressure Ptf is accumulated in the accumulated values C (sgl, ptf) (S510). Thus, the number of data accumulated in the accumulated values C (sgl, ptf) (i.e., the number of data accumulations) becomes two or more. From then on, the number of data accumulated in the accumulated values C (sgl, ptf) (i.e., the number of data accumulations) increases until the accumulated values C are cleared.

When the tank internal pressure Ptf becomes 0 kPa (YES in S502) after the data is repeatedly accumulated in the accumulated values C (sgl, ptf), it is then determined whether the normality determination regarding leakage from the liquid submerged portion has been made (i.e. whether it has been determined that there is no fuel leakage from the liquid submerged portion) in the first diagnosis (FIG. 2) (S512).

As the tank internal pressure Ptf becomes 0 kPa, the diagnostic process (S108 to S112 in FIG. 2) is executed in the first diagnosis (FIG. 2). It is assumed herein that Expression 1 has not been satisfied (NO in S108 in FIG. 2) and that the normality determination regarding leakage from the liquid submerged portion has been made (S110 in FIG. 2). Therefore, an affirmative determination is made in step S512 in the normality-time relation setting process (FIGS. 12A and 12B), and, as in step S510, data regarding a pair of the fuel liquid surface level SGL and the tank internal pressure Ptf is accumulated in the accumulated values C (sgl, ptf) (S514). The process of step S514 is a process for accumulating data regarding a pair of the fuel liquid level SGL and the tank internal pressure Ptf=0 kPa in the accumulated values C (sgl, ptf). Although this process is not indispensable and therefore does not need to be executed, it is preferable that the process be executed because execution of the process allows data to be accumulated in a wider range of the tank internal pressure Ptf.

Next, it is determined whether the number of data accumulated in the accumulated values C (sgl, ptf) (i.e., the number of accumulations) has reached a necessary number while the fuel consumption flag Fm is continuing to be in the OFF state (S516). If the number of accumulations has not reached the necessary number (NO in S516), the process is ended.

If the number of data accumulated in the accumulated values C (sgl, ptf) (i.e., the number of accumulations) has reached the necessary number (YES in S516), the coefficient k set on the basis of the accumulated values C (sgl, ptf) accumulated as described above (S518).

During the period during which the fuel consumption flag Fm is continuing to be in the OFF state, the amount of fuel in the fuel tank 2 does not change but there is a change in the tank internal pressure Ptf. Therefore, by using the accumulated values C (sgl, ptf), a graph shown in FIG. 10 can be plotted. The coefficient k can be determined based on the slope of the straight line obtained by plotting the accumulated values C (sgl, ptf).

Then, a second diagnosis, that is, the liquid submerged portion fuel leakage diagnostic process described above with reference to FIG. 9, is allowed to be executed (S520). Then, the process is ended. Therefore, the liquid submerged portion fuel leakage diagnostic process shown in FIG. 9 is started. In this liquid submerged portion fuel leakage diagnostic process, the liquid submerged portion fuel leakage diagnosis can be performed by using the coefficient k set in the normality-time relation setting process (FIGS. 12A and 12B).

Thus, in this embodiment, it is not necessary to set the coefficient k in advance for execution of the liquid submerged portion fuel leakage diagnostic process shown in FIG. 9. From this time on, the coefficient k can be repeatedly updated on the basis of the accumulation of data in the accumulated values C (sgl, ptf) as described above.

In the above-described configuration, the ECU 70 may be regarded as the normality-time relation storage portion, the fuel consumption detection portion, the fuel leakage diagnostic portion and the fuel vapor leak diagnostic portion. The normality-time relation setting process (FIGS. 12A and 12B) executed by the ECU 70 may be regarded as a process as the normality-time relation storage portion. Likewise, the fuel consumption detection process (FIG. 5) may be regarded as a process as the fuel consumption detection portion, and the liquid submerged portion fuel leakage diagnostic process (FIG. 9) may be regarded as a process as the fuel leakage diagnostic portion. The above-described purge-system leak diagnostic process may be regarded as a process as the fuel vapor leak diagnostic portion.

Effects of Fifth Embodiment (1) During the period during which it is diagnosed by the liquid submerged portion fuel leakage diagnostic process (FIG. 2), which is the first diagnosis, that there is no fuel leakage from the liquid submerged portion, the coefficient k that represents the normality-time correspondence relation can be determined based on the relation between the tank internal pressure Ptf and the fuel liquid surface level SGL by the normality-time relation setting process (FIGS. 12A and 12B) if the fuel consumption flag Fm is continuing to be in the OFF state. Thus, by storing the coefficient k, the coefficient k can be used for the liquid submerged portion fuel leakage diagnostic process (FIG. 9) from that time on.

Thus, once the coefficient k is set, the presence or absence of fuel leakage from the liquid submerged portion of the fuel tank 26 can be highly frequently diagnosed by detecting the fuel liquid surface level SGL and the tank internal pressure Ptf, without waiting for the tank internal pressure Ptf to reach the reference internal pressure (the atmospheric pressure in this example). Furthermore, since the coefficient k can be actually measured repeatedly in a state where the fuel tank is actually mounted in the vehicle, the presence or absence of fuel leakage can be more accurately diagnosed.

Sixth Embodiment

Configuration of Sixth Embodiment

In this embodiment, there is added a process in which the coefficient k that is used in Expression 2 for determining the determination reference value Mx in step S406 of the liquid submerged portion fuel leakage diagnostic process (FIG. 9) described above in the fourth embodiment is connected by the fuel temperature Tf detected by the fuel temperature sensor 28a, which is a temperature detection portion. Other processes are the same as those performed in the fourth embodiment.

Figure 13:
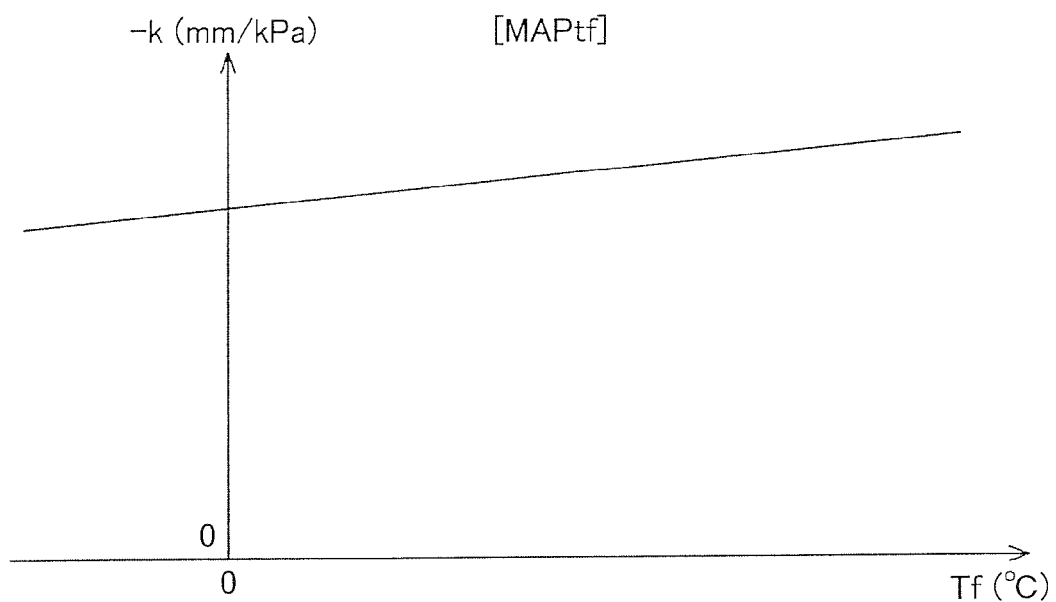
FIG. 13 is an illustrative diagram showing the configuration of a map MAPtf for determining a coefficient k on the basis of the fuel temperature Tf, the map MAPtf being employed in a sixth embodiment of the invention.

By using a map MAPtf for determining the coefficient k corresponding to the fuel temperature Tf as shown in FIG. 13, the coefficient k that is used in calculation of Expression 2 is corrected.

Operation of Sixth Embodiment

The rigidity of the outer shell of the fuel tank 26 may change according to the temperature of the fuel tank 26, depending on the material and the shape of a member that constitutes the outer shell. Therefore, the amount of strain (deformation) of the outer shell of the fuel tank 26 caused by the pressure difference between the inside and the outside of the fuel tank 26 may change according to temperature, affecting the fuel liquid surface level SGL.

Taking into consideration the case where the fuel tank 26 is made of such an outer shell, the coefficient k in Expression 2 is determined based on the fuel temperature Tf that corresponds to the temperature of the outer shell of the fuel tank 26, by using the map MAPtf. During an initial period of use of the fuel tank 26, fuel leakage from the liquid submerged portion of the fuel tank 26 does not exist due to the inspection performed when the fuel tank 26 was produced or when the fuel tank 26 was installed for the internal combustion engine 2. Therefore, the map MAPtf shown in FIG. 13 is set based on actual measurements through the use of the relation between the temperature of the outer shell of the fuel tank 26 and the fuel liquid surface level SGL.

Effects of Sixth Embodiment (1) It is possible to cope with the case where the rigidity of the outer shell of the fuel tank 26 changes according to the fuel temperature Tf, in addition to achieving the effects achieved in the fourth embodiment. Thus, in this case as well, it is possible to accurately perform the diagnosis as to whether there is fuel leakage from the liquid submerged portion.

Other Embodiments

In the fifth embodiment, a map for determining the coefficient k based on the fuel temperature Tf may be formed by accumulating values of the fuel temperature Tf in addition to values of the fuel liquid surface level SGL and the tank internal pressure Ptf as accumulated values C, and the coefficient k that is used in Expression 2 may be determined based on the fuel temperature Tf.

In the fourth and fifth embodiments, determination on the presence or absence of fuel consumption due to leak of fuel vapor from the upper space 26a (S230) is performed in the fuel consumption detection process (FIG. 5). However, in the case where such a purge-system leak diagnostic process is not executed, the fuel consumption detection process shown in FIG. 3 may be executed instead of the fuel consumption detection process shown in FIG. 5.

Although in the foregoing embodiments, two values of the fuel liquid surface level are compared as shown in Expressions 1 and 3 to perform the liquid submerged portion fuel leakage diagnosis, three or more values of the fuel liquid surface level, instead of two values thereof, may be compared to perform the diagnosis. This makes it possible to perform more accurate diagnosis.

In the first and second embodiments, the fuel liquid surface level SGL, which is detected when the tank internal pressure Ptf is equal to the atmospheric pressure, that is, the tank internal pressure. Ptf=0 kPa, is used as the reference-state liquid level, and change in the reference-state liquid level is evaluated by using Expression 1. However, the tank internal pressure Ptf at which the values of the fuel liquid surface level SGL to be compared are detected does not need to be the atmospheric pressure, and may be any other pressure as long as it is a constant tank internal pressure Ptf. In this case, the reference-state liquid level may be obtained by correcting the fuel liquid surface level SGL using the fuel temperature Tf, and the obtained reference-state liquid level may be used in Expression 1 for evaluation.

Each of the foregoing embodiments is applied to a plug-in hybrid vehicle in which the internal combustion engine 2 and the motor-generator MG2, which is an electric motor, are mounted together as drive sources for the traveling of the vehicle. However, the embodiments may also be applied to hybrid vehicles other than the plug-in hybrid vehicle, and is also applicable to a vehicle that has only the internal combustion engine 2 as a vehicle drive source and that is provided with the fuel tank 26 and the block valve 38 for the fuel tank 26.

In particular, in the plug-in hybrid vehicle, the situation in which fuel continues to be consumed occurs highly frequently, so that the situation in which fuel consumption is not detected occurs highly frequently. Therefore, the presence or absence of fuel leakage from the liquid submerged portion can be diagnosed particularly highly frequently.

What is claimed is:

1. A liquid submerged portion fuel leakage diagnostic apparatus that diagnoses presence or absence of fuel leakage from a liquid submerged portion of a fuel tank for an internal combustion engine, the liquid submerged portion being submerged in fuel in the fuel tank, and the fuel tank being connected to a canister via a vaporized fuel passage and being configured such that an internal space of the fuel tank is able to be hermetically closed by a block valve that is provided in the vaporized fuel passage, the liquid submerged portion fuel leakage diagnostic apparatus comprising:
   a pressure sensor that detects a tank internal pressure of the fuel tank;
   a liquid level sensor that detects a liquid level of the fuel in the fuel tank; and
   an electronic control unit configured to:
   extract, as a reference-state liquid level, the liquid level detected by the liquid level sensor, when the tank internal pressure detected by the pressure sensor becomes equal to a reference internal pressure;
   detect fuel consumption that is consumption of the fuel in the fuel tank; and
   diagnose the presence or absence of the fuel leakage from the liquid submerged portion, when the fuel consumption is not detected by the electronic control unit during a period between extraction timings at which a plurality of the reference-state liquid levels are extracted by the electronic control unit, based on comparison of the plurality of the reference-state liquid levels.

2. The liquid submerged portion fuel leakage diagnostic apparatus according to claim 1, wherein the fuel consumption detected by the electronic control unit includes the fuel consumption due to operation of the internal combustion engine and the fuel consumption resulting from outflow of fuel vapor into the vaporized fuel passage when the block valve is open, and an amount of the fuel consumption detected by the electronic control unit is an amount that influences a value detected by the liquid level sensor.

3. The liquid submerged portion fuel leakage diagnostic apparatus according to claim 1, wherein the electronic control unit is further configured to:
   diagnose a presence or an absence of a fuel vapor leak from the fuel tank, wherein the fuel consumption detected by the electronic control unit includes the fuel consumption due to the fuel vapor leak, the presence of which is diagnosed by the electronic control unit, the fuel consumption due to operation of the internal combustion engine, and the fuel consumption resulting from outflow of fuel vapor into the vaporized fuel passage when the block valve is open, and an amount of the fuel consumption detected by the electronic control unit is an amount that influences a value detected by the liquid level sensor.

4. The liquid submerged portion fuel leakage diagnostic apparatus according to claim 1, wherein the electronic control unit is further configured to:
   diagnose presence or absence of fuel vapor leak from the fuel tank,
   wherein the electronic control unit does not make a determination that there is a fuel leakage abnormality in the liquid submerged portion, when the electronic control unit determines that there is a fuel vapor leak abnormality.

5. The liquid submerged portion fuel leakage diagnostic apparatus according to claim 1, wherein the reference internal pressure is an atmospheric pressure.

6. The liquid submerged portion fuel leakage diagnostic apparatus according to claim 1, wherein the reference internal pressure is a pressure other than an atmospheric pressure.

7. The liquid submerged portion fuel leakage diagnostic apparatus according to claim 6, further comprising
   a temperature sensor that detects a temperature in the fuel tank, wherein the electronic control unit corrects the liquid level detected by the liquid level sensor by using the temperature detected by the temperature sensor, and extracts the corrected liquid level as the reference-state liquid level.

* * * * *

UNITED STATES PATENT AND TRADEMARK OFFICE
CERTIFICATE OF CORRECTION

PATENT NO. : 9,464,960 B2
APPLICATION NO. : 13/870559
DATED : October 11, 2016
INVENTOR(S) : Yuusaku Nishimura It is certified that error appears in the above-identified patent and that said Letters Patent is hereby corrected as shown below:

IN THE SPECIFICATION

In column 1, line 20, after "configures such that an", delete "is".

In column 3, line 2, after "from the upper space", delete "about", and insert --above--, therefor.

In column 5, line 41, before "relation storage", delete "normality time", and insert --normality-time--, therefor.

In column 8, line 35, after "hybrid vehicle in accordance", insert --with a--.

In column 9, line 64, before "tank internal pressure sensor", delete "at", and insert --a--, therefor.

In column 10, line 7, after "The upper space", insert --26a--.

In column 10, line 13, after "valve 38a", insert --is--.

In column 11, line 44, after "refueling", insert --is--.

In column 12, line 36, after "using Expression 1", delete "(S104).", and insert --(S108).--, therefor.

In column 12, line 67, after "provided in a", insert --non-volatile--.

In column 13, line 21, before "starts operating", insert --2--.

In column 13, line 22, after "26 starts, and there is", delete "to", and insert --a--, therefor.

In column 13, line 59, before "is ended." delete "pros", and insert --process--, therefor.

In column 22, line 22, after "Therefore, the ECU 70", insert --in--.

In column 22, line 66, after "liquid submerged portion", insert --(i.e.,--.

In column 24, line 29, after "(1) The ECU", insert --70--.

In column 25, line 48, after "(FIGS. 12A and 12B),", insert --after--.

In column 27, line 5, after "in the fuel", delete "tank 2", and insert --tank 26--, therefor.

Signed and Sealed this
Sixth Day of December, 2016

Michelle K. Lee
*Director of the United States Patent and Trademark Office*